United States Patent
Takahashi et al.

(10) Patent No.: US 12,194,720 B2
(45) Date of Patent: Jan. 14, 2025

(54) SHEET PROCESSING DEVICE, LAMINATING DEVICE, IMAGE FORMING APPARATUS, AND IMAGE FORMING SYSTEM

(71) Applicants: Wataru Takahashi, Tokyo (JP); Tomohiro Furuhashi, Kanagawa (JP); Shinya Monma, Kanagawa (JP); Yoshito Suzuki, Chiba (JP); Joji Akiyama, Kanagawa (JP); Yohsuke Haraguchi, Kanagawa (JP); Sho Asano, Kanagawa (JP); Wataru Nozaki, Kanagawa (JP)

(72) Inventors: Wataru Takahashi, Tokyo (JP); Tomohiro Furuhashi, Kanagawa (JP); Shinya Monma, Kanagawa (JP); Yoshito Suzuki, Chiba (JP); Joji Akiyama, Kanagawa (JP); Yohsuke Haraguchi, Kanagawa (JP); Sho Asano, Kanagawa (JP); Wataru Nozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 319 days.

(21) Appl. No.: 17/550,053

(22) Filed: Dec. 14, 2021

(65) Prior Publication Data
US 2022/0289512 A1 Sep. 15, 2022

(30) Foreign Application Priority Data
Mar. 11, 2021 (JP) .................................. 2021-038928

(51) Int. Cl.
B32B 38/18 (2006.01)
B32B 37/00 (2006.01)
(Continued)

(52) U.S. Cl.
CPC ...... *B32B 38/1825* (2013.01); *B32B 37/0053* (2013.01); *B32B 37/185* (2013.01); *B32B 38/145* (2013.01); *B32B 2037/0061* (2013.01)

(58) Field of Classification Search
CPC ............ B32B 38/1825; B32B 37/0053; B32B 37/185; B32B 38/145; B32B 2037/0061;
(Continued)

(56) References Cited

U.S. PATENT DOCUMENTS

| | | |
|---|---|---|
| 2009/0039593 A1 | 2/2009 | Kikkawa et al. |
| 2011/0103921 A1 | 5/2011 | Suzuki et al. |

(Continued)

FOREIGN PATENT DOCUMENTS

| | | |
|---|---|---|
| JP | 9-164593 | 6/1997 |
| JP | 2006-160429 | 6/2006 |

(Continued)

*Primary Examiner* — Cynthia L Schaller
(74) *Attorney, Agent, or Firm* — Harness, Dickey & Pierce, P.L.C.

(57) ABSTRACT

A sheet processing device includes a conveyor, a rotator, a separator, and control circuitry. The conveyor conveys a two-ply sheet in which two sheets are overlapped and bonded together at a portion of the two-ply sheet. The rotator winds the two-ply sheet. The control circuitry causes the conveyor to convey the two-ply sheet in a winding direction to wind the two-ply sheet around the rotator such that a sagging space is created in the two-ply sheet, and causes the separator to insert into the sagging space to separate the two-ply sheet into two sheets. The control circuitry causes the conveyor to convey the two-ply sheet in a direction opposite the winding direction before an insertion of the separator into the sagging space.

20 Claims, 17 Drawing Sheets

(51) Int. Cl.
*B32B 37/18* (2006.01)
*B32B 38/00* (2006.01)

(58) Field of Classification Search
CPC ....... B32B 38/18; B32B 37/142; B65H 5/301; B65H 2403/942; B65H 2801/27; B65H 37/04
See application file for complete search history.

(56) References Cited

U.S. PATENT DOCUMENTS

| | | |
|---|---|---|
| 2011/0248440 A1 | 10/2011 | Sugiyama et al. |
| 2012/0267846 A1 | 10/2012 | Nakada et al. |
| 2015/0031520 A1 | 1/2015 | Nakada et al. |
| 2016/0340145 A1 | 11/2016 | Kunieda et al. |
| 2019/0284012 A1 | 9/2019 | Yoneyama et al. |
| 2020/0247636 A1 | 8/2020 | Furuhashi et al. |
| 2020/0338877 A1* | 10/2020 | Takahashi ............. B32B 43/006 |
| 2020/0341414 A1 | 10/2020 | Watanabe et al. |
| 2020/0407187 A1 | 12/2020 | Hidaka et al. |
| 2021/0347589 A1 | 1/2021 | Suzuki et al. |
| 2021/0039900 A1 | 2/2021 | Shimazu et al. |
| 2021/0039916 A1 | 2/2021 | Sugiyama et al. |
| 2021/0253385 A1 | 8/2021 | Yoshito et al. |
| 2021/0289090 A1 | 9/2021 | Monma et al. |
| 2021/0294249 A1 | 9/2021 | Takahashi et al. |
| 2021/0325804 A1 | 10/2021 | Furuhashi et al. |
| 2021/0333730 A1 | 10/2021 | Asano et al. |
| 2021/0347160 A1 | 11/2021 | Akiyama et al. |
| 2021/0354948 A1 | 11/2021 | Takahashi et al. |
| 2021/0356899 A1 | 11/2021 | Takahashi et al. |

FOREIGN PATENT DOCUMENTS

| | | |
|---|---|---|
| JP | 2020-121868 | 8/2020 |
| JP | 2020-179969 | 11/2020 |

* cited by examiner

FIG. 11A
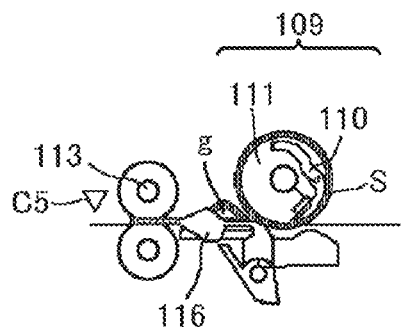
FIG. 11B
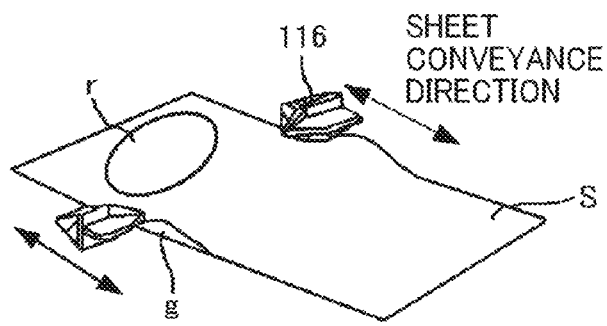
FIG. 12A
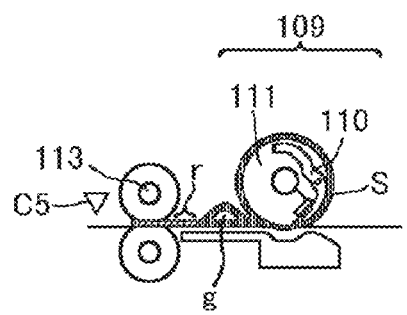
FIG. 12B
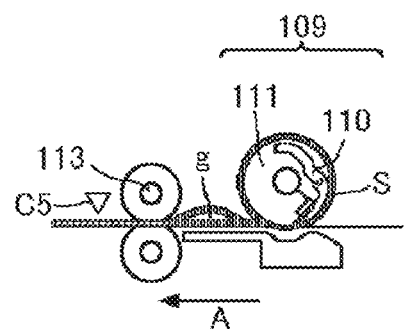
FIG. 13
| LAMINATE PROCESSING SETTING |
|---|
| ■ ADJUST CONVEYANCE AMOUNT BEFORE SEPARATION |
| ■ a: LENGTH [20] mm (def.20mm)    EXECUTE LAMINATE PROCESSING |

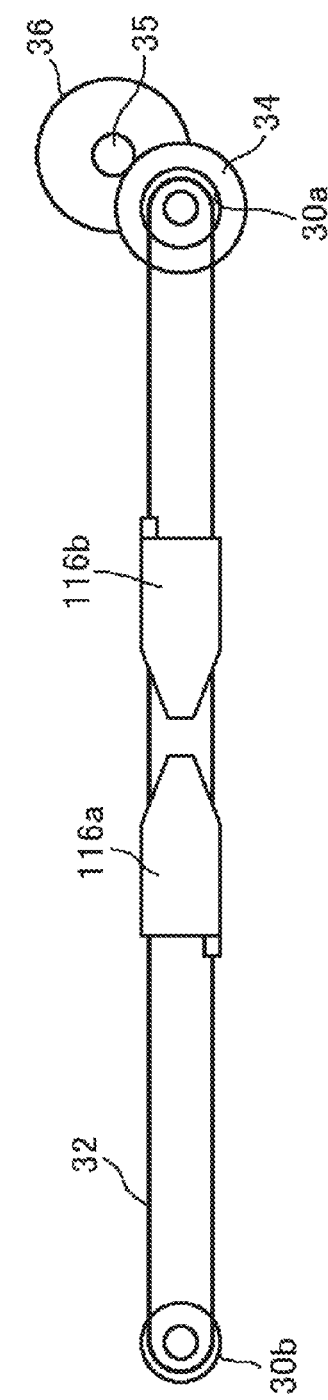
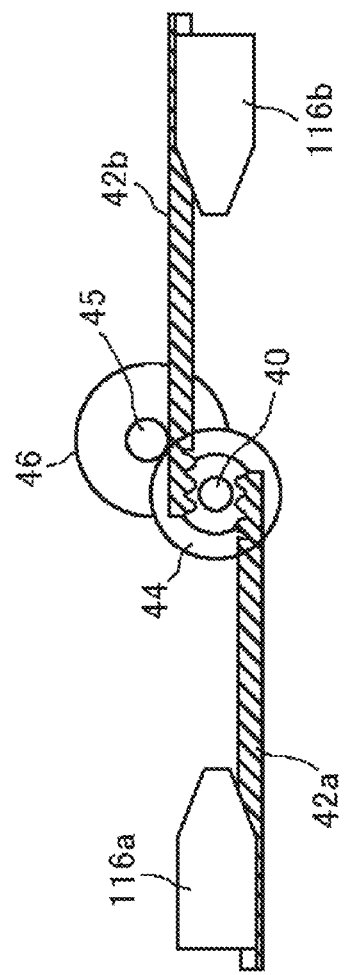
FIG. 24A
FIG. 24B

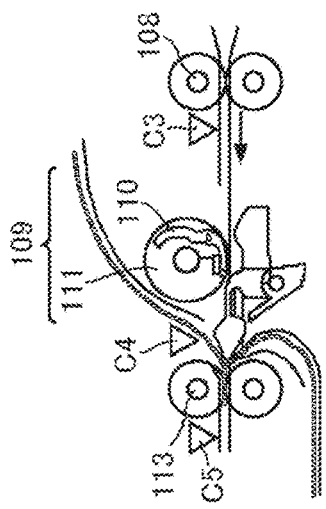
FIG. 28A
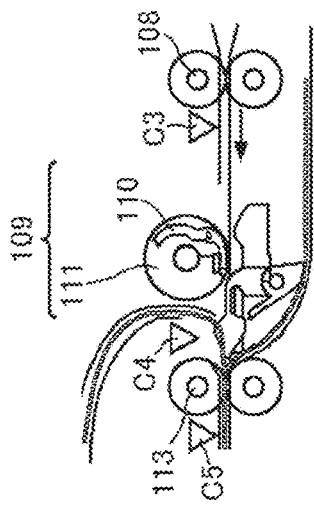
FIG. 28B
FIG. 28C
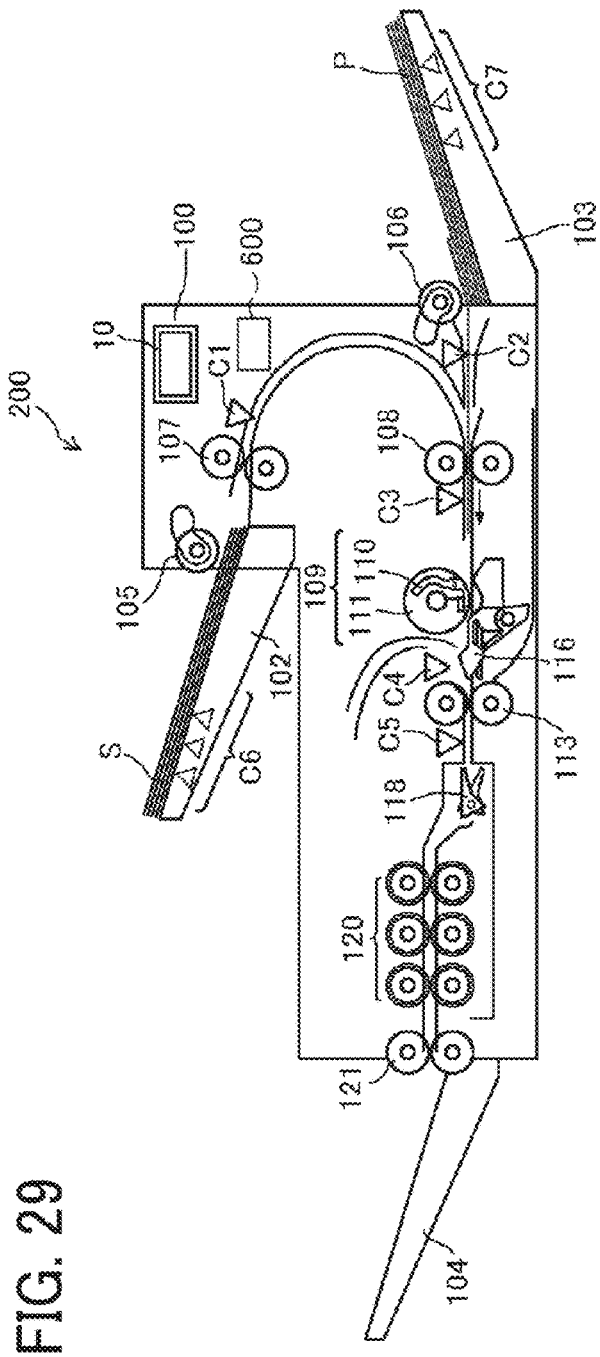
FIG. 29

| FIG. 34A |
| FIG. 34B |
| FIG. 34C |

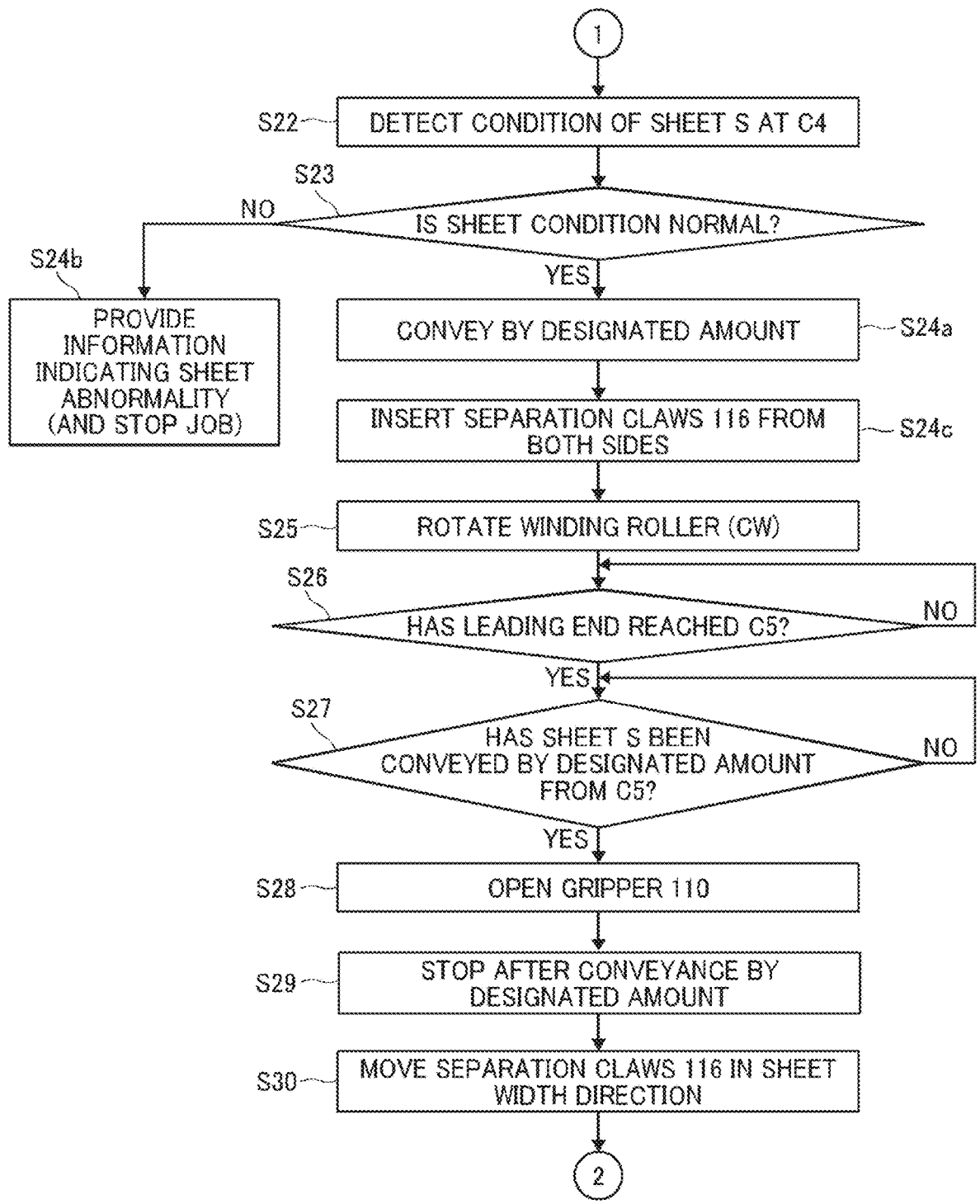

SHEET PROCESSING DEVICE, LAMINATING DEVICE, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-038928, filed on Mar. 11, 2021, in the Japan Patent Office, the entire disclosure of which is incorporated by reference herein.

BACKGROUND

Technical Field

Embodiments of the present disclosure relate to a sheet processing device, a laminating device, an image forming apparatus, and an image forming system.

Related Art

Lamination technologies have been proposed that insert an inner sheet (e.g., paper or photo) between a two-ply sheet or lamination film (e.g., a lamination pouch or lamination folder) and applying heat and pressure to the two-ply sheet to bond the two-ply sheet. The two-ply sheet is made of two sheets (plies) bonded (sealed) on one side as if one sheet is folded.

SUMMARY

In an embodiment of the present disclosure, there is provided a sheet processing device that includes a conveyor, a rotator, a separator, and control circuitry. The conveyor conveys a two-ply sheet in which two sheets are overlapped and bonded together at a portion of the two-ply sheet. The rotator winds the two-ply sheet. The control circuitry causes the conveyor to convey the two-ply sheet in a winding direction to wind the two-ply sheet around the rotator such that a sagging space is created in the two-ply sheet, and causes the separator to insert into the sagging space to separate the two-ply sheet into two sheets. The control circuitry causes the conveyor to convey the two-ply sheet in a direction opposite the winding direction before an insertion of the separator into the sagging space.

In another embodiment of the present disclosure, there is provided a laminating device that includes the sheet processing device, and a heat pressing device to heat and press the two-ply sheet.

In still another embodiment of the present disclosure, there is provided an image forming apparatus that includes an image forming device to form an image, and the sheet processing device or the laminating device.

In still yet another embodiment of the present disclosure, there is provided an image forming system that includes an image forming apparatus, and the sheet processing device or the laminating device. The sheet processing device or the laminating device is detachably attached to the image forming apparatus.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 11A is a schematic view of a separation claw that is unable to be inserted in the sagging space;

FIG. 11B is a schematic view of the separation claws moving parallel to a sheet conveyance direction of the lamination sheet;

FIG. 12A is a schematic diagram illustrating an operation of forming the sagging space at a predetermined position by the sheet processing device according to an embodiment of the present disclosure;

FIG. 12B is a diagram illustrating a sticking area conveyed downstream from an exit roller pair in the sheet conveyance direction;

FIG. 13 is a diagram illustrating an operation screen for setting a conveyance amount after winding displayed on an operation panel of the sheet processing device illustrated in FIG. 1;

FIG. 24A is a diagram illustrating a drive configuration of the separation claws illustrated in FIG. 23;

FIG. 24B is a diagram illustrating another drive configuration of the separation claw illustrated in FIG. 23;

FIG. 28A is a schematic view of a sheet guide passage of two sheets separated from the lamination sheet according to a variation of the present disclosure;

FIG. 28B is a schematic view of a sheet guide passage extending in different directions in an inverted S shape to guide the upper and lower sheets in opposite directions according to a variation of the present disclosure;

FIG. 28C is a schematic view of a sheet guide passage extending in different directions in an S shape to guide the upper and lower sheets in opposite directions according to a variation of the present disclosure;

FIG. 29 is a diagram illustrating an overall configuration of a laminating device including a sheet processing device according to an embodiment of the present disclosure;

FIG. 34 including FIGS. 34A, 34B, and 34C is a flowchart illustrating a series of operations of feeding a two-ply sheet, inserting an inner sheet, and laminating the two-ply sheet with the inner sheet being inserted.

Figure 1:
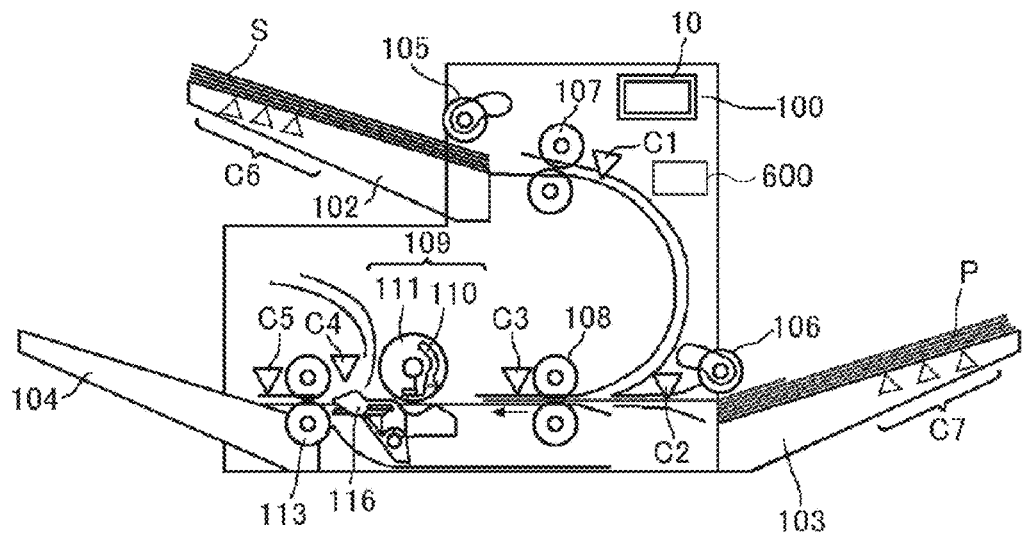
FIG. 1 is a schematic diagram illustrating a general arrangement of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic view of a general arrangement of a sheet processing device according to one embodiment of the present disclosure. A sheet processing device 100 according to the present embodiment separates two sheets (plies) of a two-ply sheet (hereinafter referred to as a lamination sheet S) and inserts and sandwiches a sheet-shaped medium (hereinafter referred to as an inner sheet P) between the separated sheets of the lamination sheet S.

The lamination sheet S is the two-ply sheet in which two sheets are overlapped and bonded together at a portion (or a side) of the two-ply sheet. For example, there is a two-ply sheet in which a first side as a transparent sheet such as a transparent polyester sheet and a second side facing the first side as a transparent or opaque sheet are bonded at one side of the two-ply sheet. Examples of the two-ply sheet also include a lamination film.

The inner sheet P is an example of the sheet-shaped medium that is inserted into the two-ply sheet. The sheet-shaped medium may be, for example, thick paper, a postcard, an envelope, plain paper, thin paper, coated paper, art paper, tracing paper, and an overhead projector (OHP) transparency.

As illustrated in FIG. 1, the sheet processing device 100 includes a sheet tray 102 as a first loader on which the lamination sheet S is loaded, a pickup roller 105 that feeds the lamination sheet S from the sheet tray 102, and a conveying roller pair 107. The sheet processing device 100 further includes a sheet feed tray 103 as a second loader on which the inner sheet P is loaded, and a pickup roller 106 that feeds the inner sheet P from the sheet feed tray 103.

The sheet tray 102 includes a sheet size sensor C6. The sheet size sensor C6 serves as a sheet size detector to detect the size of the lamination sheet S (i.e., a length of the lamination sheet S in a sheet conveyance direction). The sheet feed tray 103 includes a sheet size sensor C7. The sheet size sensor C7 serves as a medium size detector to detect the size of the inner sheet P (i.e., a length of the inner sheet P in the sheet conveyance direction).

Each of the sheet size sensor C6 and the sheet size sensor C7 includes a plurality of sensors arranged side by side in the sheet conveyance direction. Since the detection results of the sensors change depending on the size of the loaded lamination sheet S (or the inner sheet P), the sheet size sensors C6 and C7 can detect the length of the lamination sheet S (or the inner sheet P) in the sheet conveyance direction.

A conveyance sensor C1 is disposed downstream from the conveying roller pair 107 in the sheet conveyance direction to detect a sheet conveyance position of the lamination sheet S. A conveyance sensor C2 is disposed downstream from the pickup roller 106 in the sheet conveyance direction to detect the sheet conveyance position of the inner sheet P. Note that the sheet conveyance position of the lamination sheet S is a position of the lamination sheet S conveyed. Similarly, the sheet conveyance position of the inner sheet P is a position of the inner sheet P conveyed.

The conveyance sensor C1 and the conveyance sensor C2 may be used to detect the length of the lamination sheet S (or the inner sheets P) in the sheet conveyance direction.

The sheet processing device 100 includes an entrance roller pair 108 as a first conveyor, a winding roller 109 as a rotator, an exit roller pair 113 as a second conveyor, and a sheet ejection tray 104. The entrance roller pair 108, the winding roller 109, the exit roller pair 113, and the sheet ejection tray 104 are disposed downstream from the conveying roller pair 107 and the pickup roller 106 in the sheet conveyance direction. The sheet processing device 100 further includes a separation claw 116 as a separator between the winding roller 109 and the exit roller pair 113. The separation claw 116 is movable in a width direction of the sheet S.

A conveyance sensor C3 that detects the sheet conveyance positions of the lamination sheet S and the inner sheet P is disposed downstream from the entrance roller pair 108 in the sheet conveyance direction. An abnormality detection sensor C4 that detects the condition of the lamination sheet S is disposed downstream from the winding roller 109 in the sheet conveyance direction. A conveyance sensor C5 that detects the sheet conveyance position of the lamination sheet S is disposed downstream from the exit roller pair 113 in the sheet conveyance direction.

The pickup roller 105, the conveying roller pair 107, the entrance roller pair 108, and the winding roller 109 are examples of a first feeder. The pickup roller 106, the entrance roller pair 108, and the winding roller 109 are examples of a second feeder.

An operation panel 10 is disposed on an exterior of the sheet processing device 100. The operation panel 10 serves as a display-operation device to display data of the sheet processing device 100 and receives input of the operation of the sheet processing device 100. The operation panel 10 also serves as a notification device to output a perceptual signal to a user. Note that, as an alternative, a notification device other than the operation panel 10 may be separately disposed in the sheet processing device 100.

The sheet processing device 100 according to the present embodiment loads the lamination sheets S and the inner sheets P on separate trays. As the lamination sheet S is conveyed in the sheet processing device 100, the sheet processing device 100 separates and opens the lamination sheet S into two sheets and inserts the inner sheet P into an opening of the lamination sheet S. The exit roller pair 113 ejects the lamination sheet S, in which the inner sheet P has been inserted, onto the sheet ejection tray 104. Thus, the lamination sheets S lie stacked on the sheet ejection tray 104.

Figure 2:
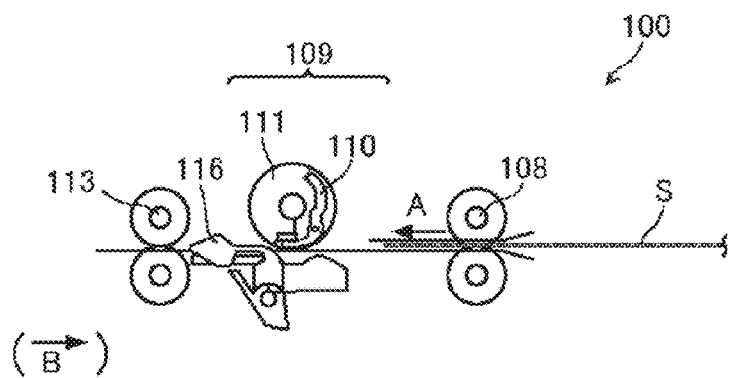
FIG. 2 is a schematic view of a main part of the sheet processing device of FIG. 1.

FIG. 2 is a schematic view of a main part of the sheet processing device of FIG. 1. As illustrated in FIG. 2, each of the entrance roller pair 108 and the exit roller pair 113 is, for example, two rollers paired with each other and driven to rotate by a driver such as a motor. The entrance roller pair 108 rotates in one direction. The exit roller pair 113 rotates in forward and reverse directions, thereby nipping and conveying the lamination sheet S and the inner sheet P together with the entrance roller pair 108.

The entrance roller pair 108 conveys the lamination sheet S and the inner sheet P toward the exit roller pair 113. The sheet conveyance direction indicated by arrow A in FIG. 2 is referred to as a forward conveyance direction (i.e., a direction A).

The exit roller pair 113 is capable of switching the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (i.e., the direction opposite the forward conveyance direction) indicated by arrow B in FIG. 2 is hereinafter referred to as a reverse conveyance direction (i.e., a direction B).

The sheet processing device 100 is provided with the winding roller 109 as a rotator and the separation claw 116 that are disposed between the entrance roller pair 108 and the exit roller pair 113. The winding roller 109 is driven by the driver such as the motor to rotate in the forward and reverse directions. The direction of rotation of the winding roller 109 is switchable between the forward direction (i.e., clockwise direction) and the reverse direction (i.e., counter-clockwise direction).

The winding roller 109 includes a roller 111 and a gripper 110 movably disposed on the roller 111 to grip the lamination sheet S. The gripper 110 that is movable grips a leading end of the lamination sheet S in the forward conveyance direction, together with the roller 111. The gripper 110 may be integrated with the outer circumference of the roller 111 or may be a separate component.

Next, a description is given of a series of operations performed in the sheet processing device 100, with reference to FIGS. 1 to 22. The series of operations performed in the sheet processing device 100 indicates the operations from separating the lamination sheet S to inserting the inner sheet P into the lamination sheet S. Note that, in FIGS. 3 to 22, elements identical to the elements illustrated in FIGS. 1 and 2 are given identical reference numerals, and the detailed descriptions of these elements are omitted.

In FIG. 1, the lamination sheet S is loaded on the sheet tray 102 such that the bonded side of the two sheets is located downstream from the pickup roller 105 in a direction of feeding the sheet S (i.e., the sheet conveyance direction). In the sheet processing device 100, the pickup roller 105 picks up the lamination sheet S from the sheet tray 102, and the conveying roller pair 107 conveys the lamination sheet S toward the entrance roller pair 108.

Next, as illustrated in FIG. 2, the entrance roller pair 108 conveys the lamination sheet S toward the winding roller 109. In the sheet processing device 100, the entrance roller pair 108 conveys the lamination sheet S with the bonded end (i.e., a leading end), which is one of four sides of the lamination sheet S, as a downstream side in the forward conveyance direction (i.e., the direction A) in FIG. 2.

Figure 3:
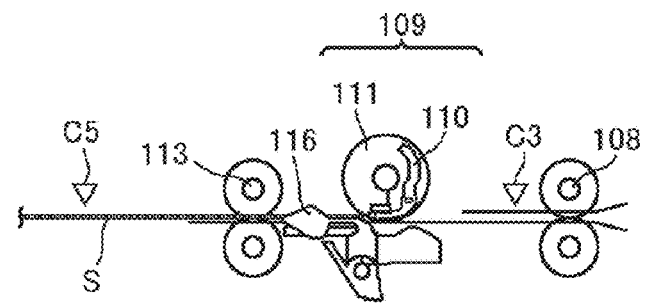
FIG. 3 is a view of the main part of the sheet processing device temporarily stopping sheet conveyance, subsequent to the state in FIG. 2.

Subsequently, as illustrated in FIG. 3, a controller 600 of the sheet processing device 100 temporarily stops conveyance of the lamination sheet S when a trailing end of the lamination sheet S in the forward conveyance direction has passed the winding roller 109. Note that these operations are performed by conveying the lamination sheet S from the conveyance sensor C3 by a designated amount in response to the conveyance sensor C3 detecting the leading end of the lamination sheet S.

Figure 4:
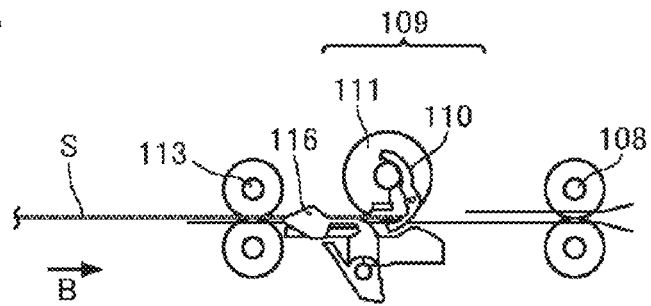
FIG. 4 is a view of the main part of the sheet processing device conveying a lamination sheet, subsequent to the state in FIG. 3.

Next, as illustrated in FIG. 4, the controller 600 of the sheet processing device 100 causes the gripper 110 to open and the exit roller pair 113 to rotate in the reverse direction to convey the lamination sheet S in the reverse conveyance direction (i.e., the direction B) toward the opened portion of the gripper 110.

Figure 5:
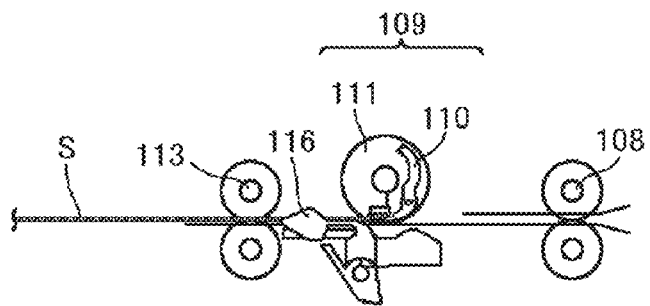
FIG. 5 is a view of the main part of the sheet processing device in a state subsequent to the state in FIG. 4.

Subsequently, as illustrated in FIG. 5, the controller 600 of the sheet processing device 100 causes the exit roller pair 113 to stop rotating to stop conveyance of the lamination sheet S when the trailing end of the lamination sheet S is inserted into the opened portion of the gripper 110, and causes the gripper 110 to close and grip the trailing end of the lamination sheet S. Note that these operations are performed when the lamination sheet S is conveyed by the designated amount.

Figure 6:
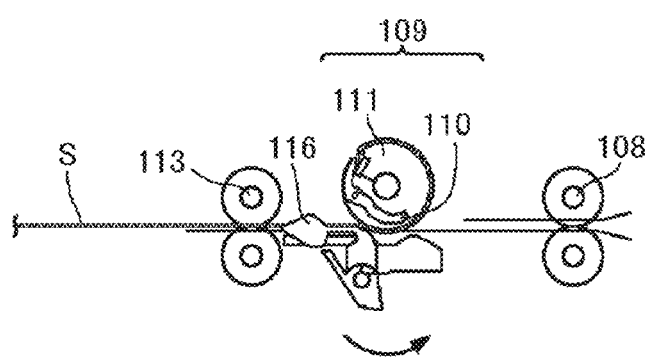
FIG. 6 is a view of the main part of the sheet processing device in which a winding roller rotates in reverse to wind the lamination sheet around the winding roller, subsequent to the state in FIG. 5.

Then, as illustrated in FIG. 6, the controller 600 of the sheet processing device 100 causes the winding roller 109 to rotate in the counterclockwise direction in FIG. 6 and to wind the lamination sheet S around the winding roller 109. The lamination sheet S is wound around the winding roller 109 from the side (i.e., the trailing end) where the two overlapping sheets of the lamination sheet S are not bonded.

Figure 7:
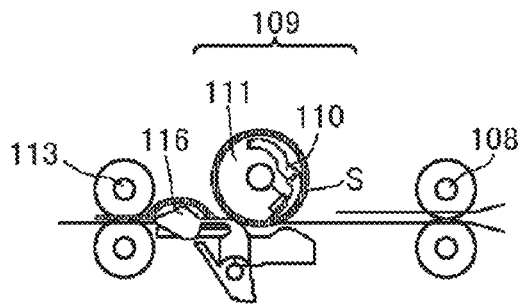
FIG. 7 is a view of the main part of the sheet processing device in which separation claws are inserted into a space between two sheets of the lamination sheet, subsequent to the state in FIG. 6.

As illustrated in FIG. 7, when the lamination sheet S that is the two-ply sheet is wound around the winding roller 109, a winding circumferential length difference is generated between the two sheets in the amount of winding of the lamination sheet S around the circumference of the winding roller 109. There is a surplus of the inner sheet closer to the center of the winding roller 109 than the outer sheet of the two sheets, which generates a slack toward the bonded end. As a result, a sagging space is generated between the two sheets constructing the two-ply sheet. As the separation claws 116 are inserted into the space generated as described above, from opposed sides of the lamination sheet S, the space between the two sheets is reliably maintained. When the conveyance sensor C5 detects the leading end of the lamination sheet S, the controller 600 of the sheet processing device 100 receives a trigger signal from the conveyance sensor C5. The controller 600 of the sheet processing device 100 causes the exit roller pair 113 to convey the lamination sheet S by a designated amount from the conveyance sensor C5.

Here, a description is further given of the separation claw 116.

Figure 23:
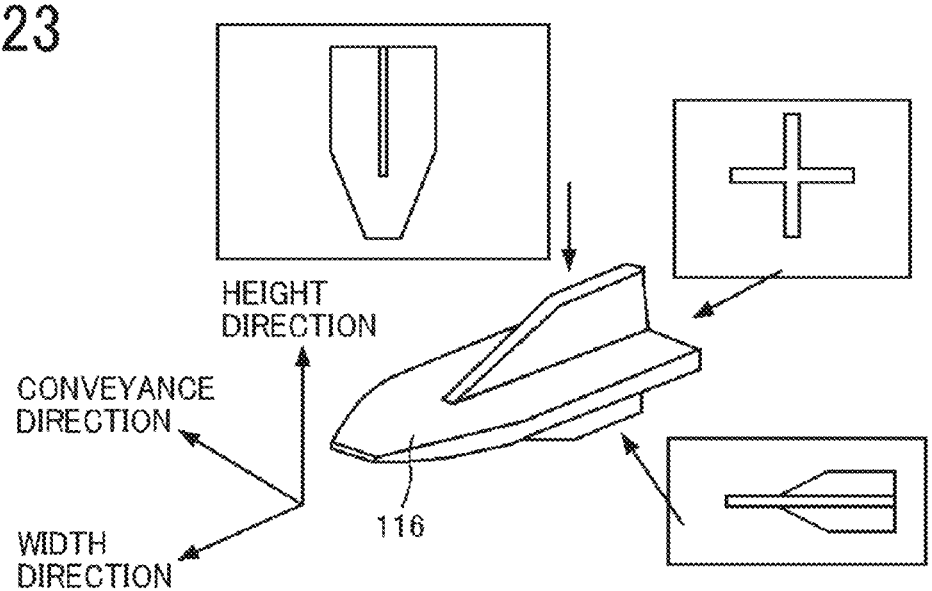
FIG. 23 is a schematic view of one of the separation claws of the sheet processing device illustrated in FIG. 1.
Figure 25:
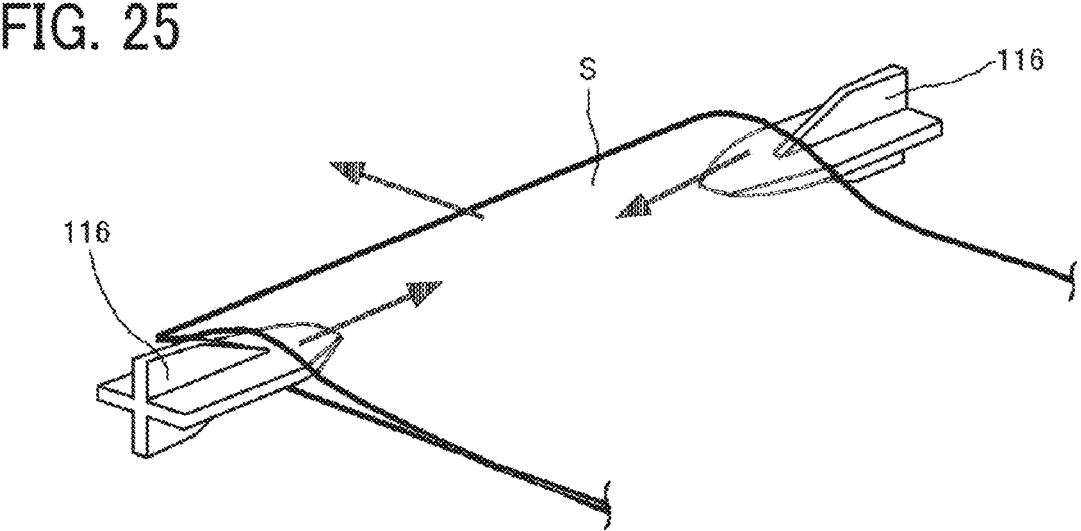
FIG. 25 is a perspective view of the separation claws inserted into the lamination sheet.

FIG. 23 is a schematic view of the separation claw 116 of the sheet processing device 100. FIGS. 24A and 24B are schematic diagrams illustrating examples of a drive configuration of the separation claw 116. Further, FIG. 25 is a perspective view of the separation claws 116 inserted in the lamination sheet S.

As illustrated in FIG. 23, when viewed in the sheet conveyance direction, the size in the height (vertical direction) of the separation claw 116 gradually increases from the center in a width direction of the separation claw 116 to the trailing end (right end in FIG. 23). Further, when viewed in the vertical direction, the size of the separation claw 116 in the sheet conveyance direction gradually increases from the leading end to the center. When viewed in the width direction of the separation claw 116, the separation claw 116 has a cross shape.

Further, in the present embodiment, referring to FIGS. 24A and 24B, the two separation claws 116 are disposed facing each other and moved in an approaching direction and a separating direction, for example, by a belt drive mechanism as illustrated in FIG. 24A or by a rack and pinion mechanism illustrated in FIG. 24B.

Specifically, the belt drive mechanism illustrated in FIG. 24A includes a belt 32 stretched between a drive pulley 30a and a driven pulley 30b. Two separation claws 116a and 116b are attached to the belt 32 so as to face each other. The separation claw 116a is coupled to the lower side of the belt 32, and the other separation claw 116b is coupled to the upper side of the belt 32.

The drive pulley 30a is provided with a drive transmission gear 34. The rotation output from a drive motor 36 is transmitted to the drive transmission gear 34 via a motor output gear 35. That is, the rotation output from the drive motor 36 is transmitted to the belt 32.

Accordingly, as the drive motor 36 rotates clockwise in FIG. 24A, the separation claws 116a and 116b are moved close to each other. As the drive motor 36 rotates counterclockwise in FIG. 24A, the separation claws 116a and 116b are separated from each other.

The rack and pinion mechanism illustrated in FIG. 24B includes two racks 42a and 42b meshing with one pinion 40 extend in opposite directions. The two separation claws 116a and 116b are attached to the racks 42a and 42b, respectively, to face each other. The pinion 40 is provided with a drive transmission gear 44. The rotation output from a drive motor 46 is transmitted to the drive transmission gear 44 via a motor output gear 45. That is, the rotation output from the drive motor 46 is transmitted to each of the racks 42a and 42b.

Accordingly, as the drive motor 46 rotates clockwise in FIG. 24B, the separation claws 116a and 116b are moved close to each other. As the drive motor 46 rotates counterclockwise in FIG. 24B, the separation claws 116a and 116b are separated from each other.

As described above, the separation claws 116 in the present embodiment having the above-described shape are movable in the width direction of the lamination sheet S. Accordingly, the separation claws 116 can be smoothly inserted into the space generated in the lamination sheet S as illustrated in FIG. 25.

Figure 8:
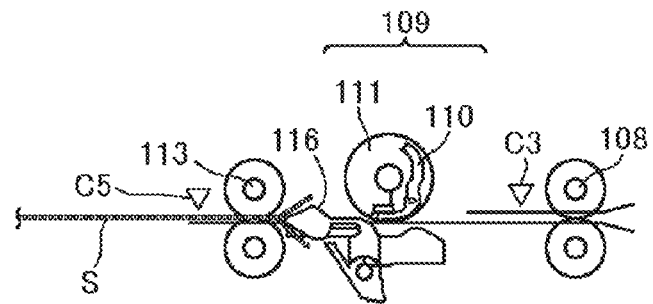
FIG. 8 is a view of the main part of the sheet processing device in which the winding roller rotates in a forward direction so as to move the space in the lamination sheet and the separation claws to a trailing end of the lamination sheet, subsequent to the state in FIG. 7.

A description of the series of operations of the sheet processing device 100 is continued below. With the separation claws 116 inserted in the space in the lamination sheet S, the controller 600 of the sheet processing device 100 causes the winding roller 109 to rotate in the clockwise direction (see FIG. 7) and shift the space generated in the lamination sheet S to the trailing end of the lamination sheet S in the forward conveyance direction (i.e., the direction A), as illustrated in FIG. 8. After the winding roller 109 has been rotated by a designated amount, the controller 600 of the sheet processing device 100 causes the gripper 110 to open. As a result, the lamination sheet S is separated into the upper and lower sheets at the trailing end.

In this state, the controller 600 of the sheet processing device 100 temporarily stops the conveyance of the lamination sheet S and further moves the separation claws 116 in the width direction of the lamination sheet S to separate the whole area of the trailing end of the lamination sheet S. When the conveyance sensor C5 detects the leading end of the lamination sheet S, the controller 600 of the sheet processing device 100 receives a trigger signal from the conveyance sensor C5. The controller 600 of the sheet processing device 100 causes the exit roller pair 113 to convey the lamination sheet S by a designated amount from the conveyance sensor C5.

Figure 26:
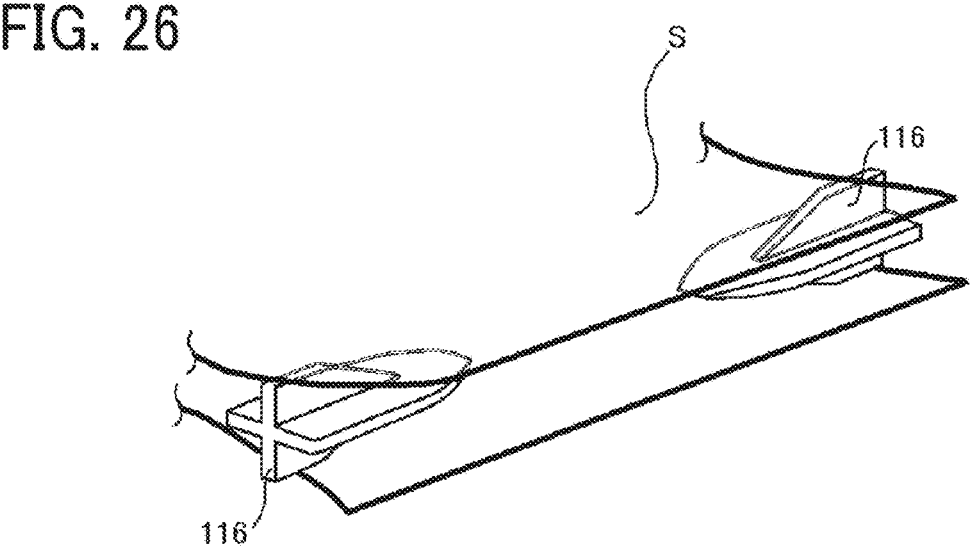
FIG. 26 is a perspective view of the separation claws and the lamination sheet in the state illustrated in FIG. 8.

FIG. 26 is a perspective view of the separation claws 116 and the lamination sheet S in the state illustrated in FIG. 8.

Since each of the separation claws 116 functions as a branching claw that guides the two separated sheets of the lamination sheet S in different directions due to the above-described shape (see FIG. 23), the two separated sheets of the lamination sheet S may be kept in postures to be conveyed to different sheet conveyance passages.

Figure 27:
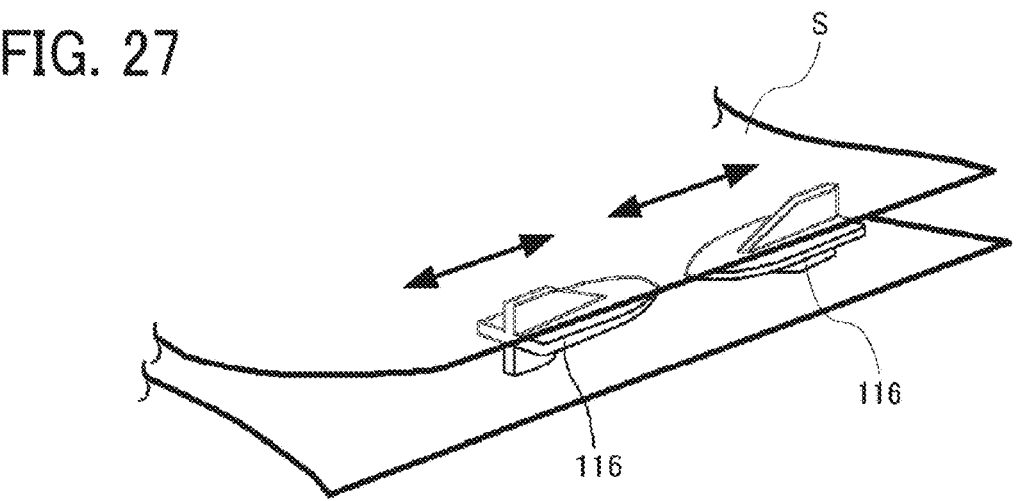
FIG. 27 is another perspective view of the separation claws and the lamination sheet in the state illustrated in FIG. 8.

Further, since the separation claws 116 are movable in the width direction of the lamination sheet S (see FIGS. 24A and 24B), the separation claws 116 are positioned suitably to support the postures of the two sheets of the lamination sheet S as illustrated in FIG. 27. Therefore, even when the size of the lamination sheet S and the rigidity (or retentivity corresponding to the propensity to retain a particular shape once applied, such as curvature of paper) of the lamination sheet S change, the two separated sheets of the lamination sheet S are guided in desired branching directions. This configuration eliminates the need for a lamination sheet branching member over the whole area in a width direction of a sheet conveyance passage and a driver to drive the branching claw, thereby reducing the cost when compared with the configuration of a known sheet processing device.

Figure 9:
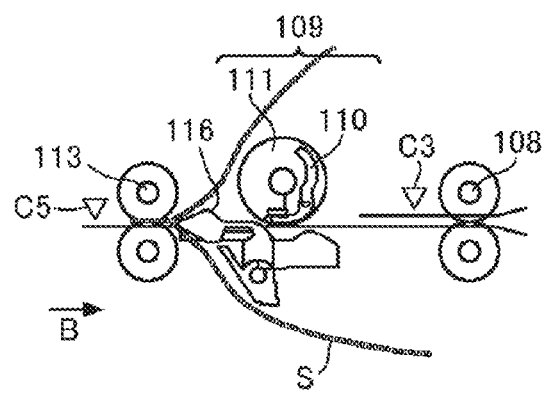
FIG. 9 is a view of the sheet processing device conveying the lamination sheet in reverse with ends of the two sheets separated, subsequent to the state in FIG. 8.

Next, as illustrated in FIG. 9, after the separation claws 116 have separated the whole area of the trailing end of the lamination sheet 5, the controller 600 of the sheet processing device 100 causes the exit roller pair 113 to rotate in the counterclockwise direction in FIG. 9 and convey the lamination sheet S in the reverse conveyance direction (i.e., the direction B). In other words, the separation claws 116 guide the two separated sheets of the lamination sheet S in the upper and lower directions and thus the two sheets are fully separated.

The controller 600 of the sheet processing device 100 temporarily stops the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is open widely.

When the conveyance sensor C5 detects the leading end of the lamination sheet S, the controller 600 of the sheet processing device 100 receives a trigger signal from the conveyance sensor C5. The controller 600 of the sheet processing device 100 causes the exit roller pair 113 to convey the lamination sheet S by a designated amount from the conveyance sensor C5.

Next, problems that are solved by the embodiments of the present disclosure is described below.

Figure 10A:
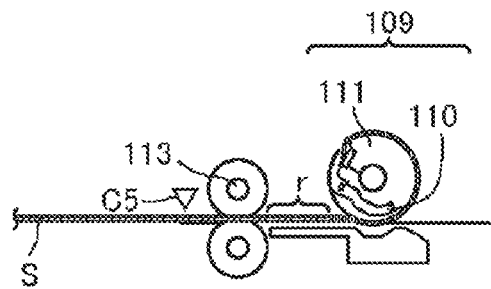
FIG. 10A is a schematic view of a state before a sagging space is formed.
Figure 10B:
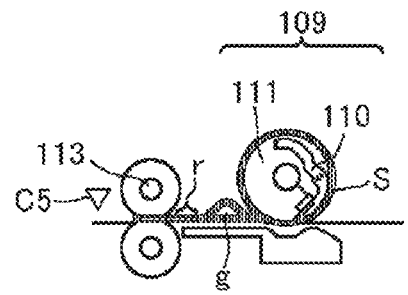
FIG. 10B is a schematic view of the sagging space formed near the winding roller.

FIG. 10A is a diagram illustrating a state before a sagging space g is formed near the winding roller 109. FIG. 10B is a schematic view of the sagging space g formed near the winding roller 109. Even when a sticking area r is formed between the two sheets of the lamination sheet S as illustrated in FIG. 10A, the controller 600 of the sheet processing device 100 causes the winding roller 109 to wind the lamination sheet S, and the sticking area r of the lamination sheet S is forcibly peeled off. However, the sticking area r may remain at a position relatively distant from the winding roller 109. Accordingly, the sagging space g is formed proximate to the winding roller 109.

In this case, as illustrated in FIG. 11A, an insertion position of the separation claw 116 does not match the sagging space g. As a result, the separation claw 116 are not inserted into the sagging space g. To address such a situation, as illustrated in FIG. 11B, it is desirable to provide a moving mechanism that moves the separation claw 116 in parallel with the sheet conveyance direction and a position detector that detects the sagging space g. However, there may be some problems such as an upsizing of a device and an increasing of cost.

In order to address such a situation, in the present embodiment, the controller 600 of the sheet processing device 100 causes the winding roller 109 to wind the lamination sheet S and form the sagging space gas illustrated in FIG. 12A. Then, the controller 600 of the sheet processing device 100 causes the winding roller 109 to convey the lamination sheet S in the direction A opposite to the winding direction to convey the sticking area r downstream from the exit roller pair 113 in the forward conveyance direction as illustrated in FIG. 12B. As a result, the sticking area r between the exit roller pair 113 and the winding roller 109 is reduced. Thus, the sagging space g is formed between the two sheets of the lamination sheet S at the position at which the sticking area r is previously formed.

In the other word, the sagging space g is formed at the position matching the insertion position of the separation claw 116. Accordingly, the separation claw 116 is stably inserted into the sagging space g.

The operation of moving the sagging space g after winding the lamination sheet S around the winding roller 109 in this way is referred to as a conveyance operation after winding. The conveyance operation may be performed on the lamination sheet S in which the sticking area r is not generated. In this case, since there is no sticking between the winding roller 109 and the exit roller pair 113 from the beginning, the change of the position of the sagging space g is small enough not to affect the separation operation.

A description is given below of an advantageous configuration of the sheet processing device 100 according to one or more embodiments of the present disclosure.

It is desirable that the conveyance distance (hereinafter referred to as conveyance amount after winding) of the lamination sheet S in the direction (i.e., the forward conveyance direction indicated by arrow A in FIG. 12B) opposite to the winding direction is set in advance before the sheet processing (separating) is performed. By setting the conveyance amount after winding before the sheet processing in advance, the sagging space g is formed at a stable position.

It is desirable that the conveyance amount after winding is equal to or less than a distance between the centers of the winding roller 109 and the exit roller pair 113. Since it is sufficient that the sticking area r does not occur between the winding roller 109 and the exit roller pair 113, the lamination sheet S is not excessively conveyed, which is efficient.

Further, it is desirable that the conveyance amount after winding is automatically changed according to the size and (or) the thickness of the lamination sheet S. Alternatively, it is desirable that the conveyance amount after winding is changed by a user.

FIG. 13 is a diagram of an operation screen for setting the conveyance amount after winding displayed on the operation panel of the sheet processing device 100 illustrated in FIG. 1. As illustrated in FIG. 13, the user touches the screen of the operation panel 10 to adjust and input the conveyance amount after winding (in FIG. 13, displayed as conveyance amount before separation). Thus, the user presets the conveyance amount after winding. In this case, since the user sets an optimal conveyance amount after winding according to the lamination sheet S used by the user, a stable sheet processing (separating) is performed.

Further, the user may input the sheet data (e.g., size, thickness, material) of the lamination sheet S from the operation panel 10 to set the conveyance amount after winding based on the sheet data. In this case, the lamination sheet S is not excessively conveyed, which is efficient.

Figure 14A:
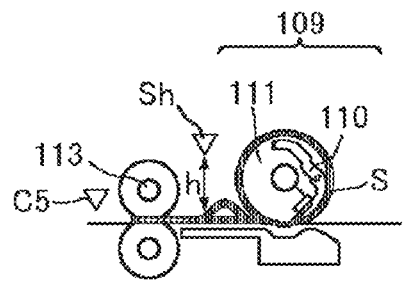
FIG. 14A is a schematic view of a sheet detector that detects the height of the sagging space.
Figure 14B:
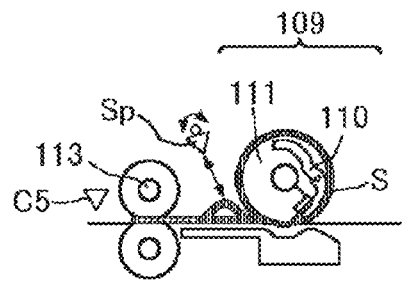
FIG. 14B is a schematic view of a sheet detector that detects the position of the sagging space in the sheet conveyance direction.

FIG. 14A is a schematic view of a sheet detector (sensor) that detects a height of the sagging space g. FIG. 14B is a schematic view of a sheet detector (sensor) that detects the position of the sagging space g in the conveyance direction.

As illustrated in FIG. 14A, a sensor Sh that detects the height of the sagging space g may be further provided to detect a height h of the sagging space g at the position where the separation claw 116 can be inserted. If the detected height h is a threshold value or less, the controller 600 of the sheet processing device 100 causes the winding roller 109 to convey the lamination sheet S in the direction opposite to the winding direction. While if the height h is larger than the threshold value, the controller 600 of the sheet processing device 100 causes the separation claw 116 to insert into the lamination sheet S.

The above-described configuration is efficient because the height of the sagging space g is detected and the lamination sheet S is conveyed in the direction opposite to the winding direction only when necessary, so that the lamination sheet S is not excessively conveyed.

As illustrated in FIG. 14B, a sensor Sp that detects a peak position of the sagging space g may be further provided. When the detected peak position is not the position where the separation claw 116 can be inserted into the lamination sheet S, the controller 600 of the sheet processing device 100 causes the exit roller pair 113 to convey the lamination sheet S in the direction opposite to the winding direction. On the other hand, when the detected position by the sensor Sp is the position where the separation claw 116 can be inserted into the lamination sheet S, the controller 600 of the sheet processing device 100 causes the separation claw 116 to insert into the lamination sheet S. That is, the controller 600 of the sheet processing device 100 may cause the exit roller pair 113 to convey the lamination sheet S continuously until the peak position of the sagging space g is detected at a position where the separation claw 116 can be inserted into the lamination sheet S.

In this case, since the conveyance can be performed until the sagging space g is formed at a desired position between the lamination sheet S, a stable sheet processing (separating) can be performed.

In the above-described embodiment (including the advantageous configuration), when the lamination sheet S is conveyed in the direction opposite to the winding direction, it is desirable to insert the separation claw 116 into the lamination sheet S stopped together with the sagging space g after the conveyance. The separation claw 116 can be stably inserted into the sagging space of the lamination sheet S, which is advantageous. Alternatively the separation claw 116 may be inserted during the conveyance of the lamination sheet S.

Next, a description is given of an operation of inserting the inner sheet P into the separated lamination sheet S.

The sheet processing device 100 of the present embodiment inserts the one or more inner sheets P into the lamination sheet S depending on the size of the lamination sheet S (i.e., the length of the lamination sheet S in the sheet conveyance direction) and the size of the inner sheet P (i.e., the length of the inner sheet P in the sheet conveyance direction). Firstly, a single insertion mode is described, and next, a multiple insertion mode is described. In the single insertion mode, the sheet processing device 100 inserts the single inner sheet P into the lamination sheet S. In the multiple insertion mode, the sheet processing device 100 inserts the plurality of inner sheets P into the lamination sheet S along the sheet conveyance direction.

Figure 15:
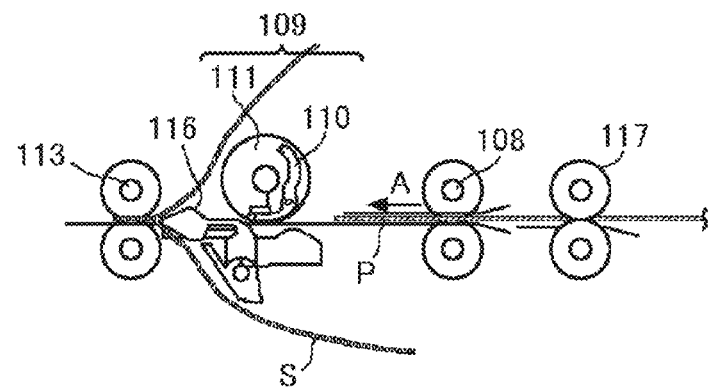
FIG. 15 is a schematic view of the sheet processing device in a single insertion mode, overlaying the two sheets one on another after the state in FIGS. 12A and 12B.

First, the single insertion mode is described. As illustrated in FIG. 15, the controller 600 of the sheet processing device 100 causes the entrance roller pair 108 to rotate to convey the inner sheet P conveyed from the sheet feed tray 103 (see FIG. 1) toward the exit roller pair 113 in the forward conveyance direction (i.e., the direction A).

Figure 16:
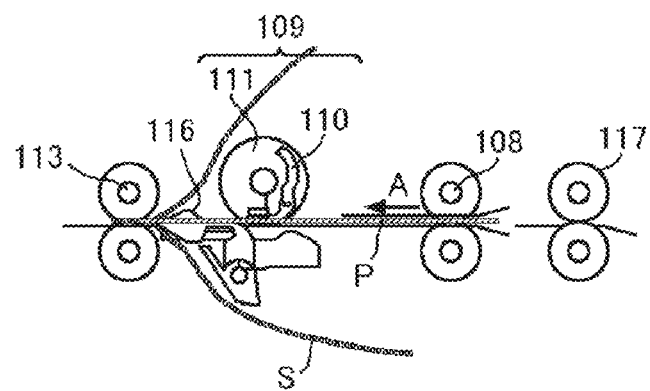
FIG. 16 is a schematic view of the sheet processing device in the single insertion mode, inserting an inner sheet into an opening of the lamination sheet after the state in FIG. 15.

Subsequently, as illustrated in FIG. 16, the controller 600 of the sheet processing device 100 causes the exit roller pair 113 to rotate so that the lamination sheet S and the inner sheet P meet, and insert the inner sheet P into the opening of the lamination sheet S.

Figure 17:
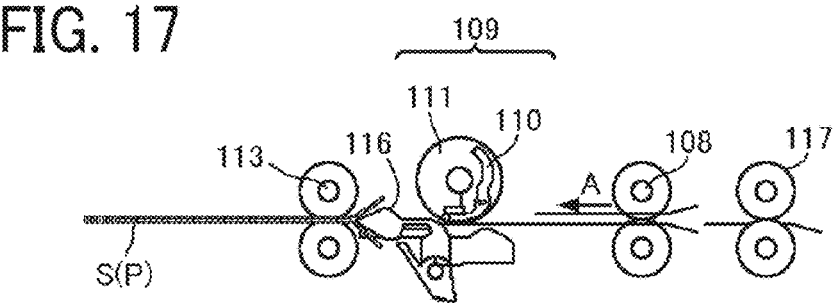
FIG. 17 is a schematic view of the sheet processing device in the single insertion mode, conveying the lamination sheet in which the inner sheet is inserted after the state in FIG. 16.

Then, as illustrated in FIG. 17, the controller 600 of the sheet processing device 100 causes the exit roller pair 113 to convey the lamination sheet S in which the inner sheet P is inserted in the forward conveyance direction (i.e., the direction A). Thus, the two sheets of the lamination sheet S are overlapped one on another again so as to close the opening of the lamination sheet S. The exit roller pair 113 or a roller disposed downstream from the exit roller pair 113 in the forward conveyance direction ejects and loads the lamination sheet S sandwiching the inner sheet P onto the sheet ejection tray 104 (see FIG. 1).

Next, the multiple insertion mode is described. In the multiple insertion mode, the plurality of inner sheets P (two sheets in the following embodiments) can be inserted into the lamination sheet S in the sheet conveyance direction.

Figure 18:
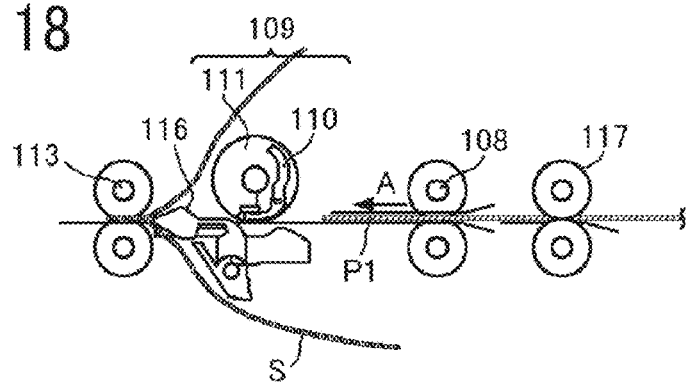
FIG. 18 is a schematic view of the sheet processing device in a multiple insertion mode, overlaying the two sheets one on another.

As illustrated in FIG. 18, the controller 600 of the sheet processing device 100 causes the entrance roller pair 108 to rotate to convey the first inner sheet (hereinafter referred to as a first inner sheet P1) from the sheet feed tray 103 (see FIG. 1) to the exit roller pair 113 in the forward conveyance direction (i.e., the direction A).

Figure 19:
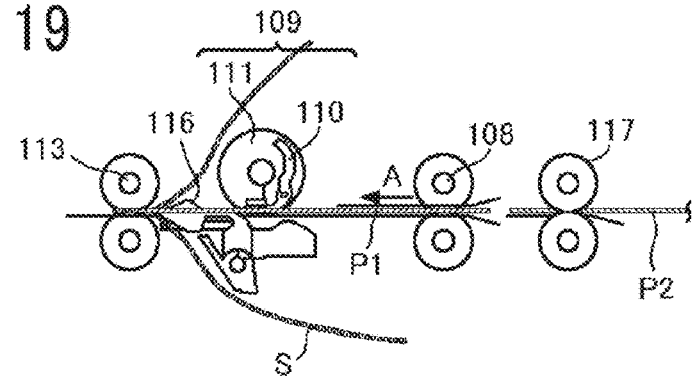
FIG. 19 is a schematic view of the sheet processing device in the multiple insertion mode, conveying the lamination sheet in which a first inner sheet is inserted after the state in FIG. 18.

Subsequently, as illustrated in FIG. 19, the controller 600 of the sheet processing device 100 causes the exit roller pair 113 to rotate so that the lamination sheet S and the first inner sheet P1 meet, and insert the first inner sheet P1 into the opening of the lamination sheet S. At this time, the controller 600 of the sheet processing device 100 causes the pickup roller 106 to rotate and convey the second inner sheet (hereinafter referred to as a second inner sheet P2) from the sheet feed tray 103 (see FIG. 1) toward the exit roller pair 113 in the forward conveyance direction (i.e., the direction A).

Figure 20:
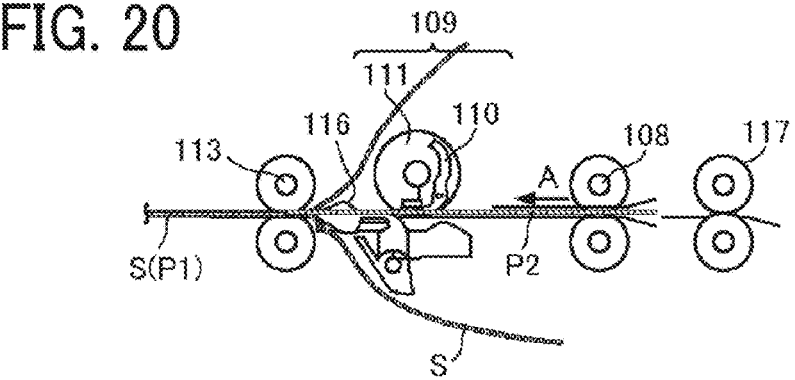
FIG. 20 is a schematic view of the sheet processing device in the multiple insertion mode, conveying the lamination sheet in which a second inner sheet is inserted after the state in FIG. 19.

Subsequently, as illustrated in FIG. 20, the controller 600 of the sheet processing device 100 causes the entrance roller pair 108 to rotate so that the lamination sheet S and the second inner sheet P2 meet, and insert the second inner sheet P2 into the opening of the lamination sheet S.

Figure 21:
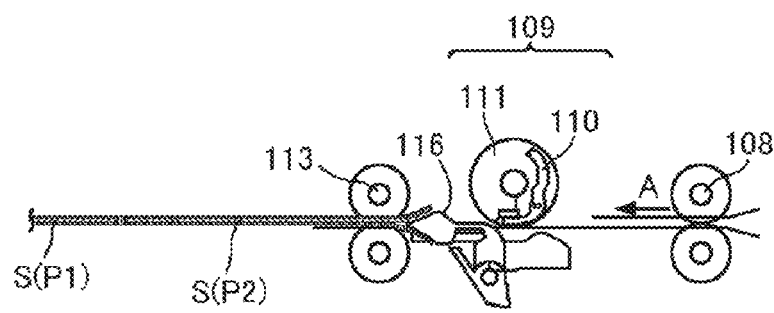
FIG. 21 is a schematic view of the sheet processing device in the multiple insertion mode, conveying the lamination sheet in which the first inner sheet and the second inner sheet are inserted after the state in FIG. 20.

As illustrated in FIG. 21, the controller 600 of the sheet processing device 100 causes the exit roller pair 113 to convey the lamination sheet S in which the first inner sheet P1 and the second inner sheet P2 are inserted in the forward conveyance direction (i.e., the direction A). Thus, the two sheets of the lamination sheet S are overlapped one on another again so as to close the opening of the lamination sheet S.

Even in a case where there are three or more inner sheets, the inner sheets can be sandwiched by substantially the same operations.

Figure 22:
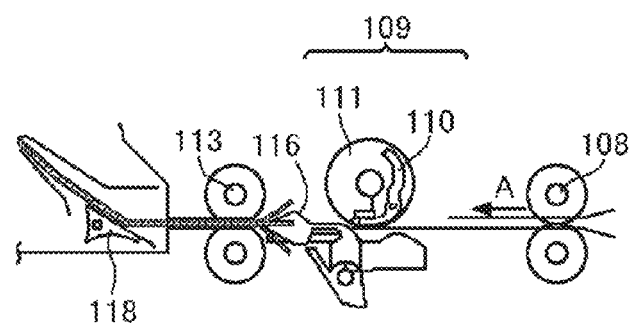
FIG. 22 is a schematic view of the sheet processing device after the laminating operation is completed.

As an alternative example, in a case where a sheet processing device 100 includes a heat pressing device capable of heating and pressing the lamination sheet S, as illustrated in FIG. 22, a branching claw 118 may switch the sheet conveyance passages of the lamination sheet S to convey the lamination sheet S to the heat pressing device.

Not only in the multiple insertion mode but also in the single insertion mode, the sheet conveyance passages of the lamination sheet S may be switched with the branching claw 118 similarly.

As described above, the controller 600 of the sheet processing device 100 according to the present embodiment controls the driver and other parts to perform the insertion process to insert the inner sheet P into the lamination sheet S.

Next, a configuration is described in which the sheet processing device 100 acquires the size (i.e., length in the sheet conveyance direction) of the lamination sheet S and the inner sheet P, and the number of inner sheets P to be inserted.

As illustrated in FIG. 1, the sheet processing device 100 in the present embodiment includes the sheet size sensor C6 as a sheet size detector and the sheet size sensor C7 as a medium size detector. Based on the detection results of the sheet size sensors C6 and C7, when the length of the inner sheet P in the sheet conveyance direction is equal to the threshold value or less, the controller 600 of the sheet processing device 100 automatically switches to the multiple insertion mode and performs the insertion process. On the other hand, when the length of the inner sheet P in the sheet conveyance direction is equal to the threshold value or more, the controller 600 of the sheet processing device 100 automatically switches to the single insertion mode and performs the insertion process.

In particular, when the length of the inner sheet P in the sheet conveyance direction is half of the length of the lamination sheet S in the sheet conveyance direction or less, the controller 600 of the sheet processing device 100 may automatically switch to the multiple insertion mode and perform the insertion process. In the case of the multiple insertion mode, the number of inner sheets P to be inserted into the lamination sheet S is calculated from the quotient of the size of the lamination sheet S and the size of the inner sheet P.

Instead of or in addition to the detection results of the sheet size sensors C6 and C7, the controller 600 of the sheet processing device 100 may use the detection results of the conveyance sensors C1 and C2.

As described above, the controller 600 of the sheet processing device 100 according to the present embodiment automatically controls the insertion process according to the sizes of the lamination sheet S and the inner sheet P.

Further, as illustrated in FIG. 1, the controller 600 of the sheet processing device 100 in the present embodiment loads the lamination sheets S and the inner sheets P on separate trays and conveys separately. Accordingly, the convenience is enhanced without loading the lamination sheet S and the inner sheet P in the predetermined order. Note that, in the present embodiment, the lamination sheets S are loaded on the sheet tray 102, and the inner sheets P are loaded on the sheet feed tray 103. However, the tray on which the lamination sheet S is loaded and the tray on which the inner sheet P is loaded are not limited to the above-described trays. For example, the inner sheet P may be loaded on the sheet tray 102 and the lamination sheet S may be loaded on the sheet feed tray 103.

A description is given of some examples of sheet guide passages of the two separated sheets of the lamination sheet S, with reference to FIGS. 28A, 28B, and 28C. FIGS. 28A, 28B, and 28C are schematic views of some examples of sheet guide passages of the two separated sheets of the lamination sheet S. The sheet processing device 100 illustrated in FIG. 28A has the same sheet guide passages as the sheet processing device 100 illustrated in FIG. 9 to guide the upper and lower sheets in the same direction from the bonded portion of the lamination sheet S. Alternatively, as illustrated in FIG. 28B, the sheet processing device 100 may have sheet guide passages extending in different directions in an inverted S shape to guide the upper and lower sheets in opposite directions. Further, as illustrated in FIG. 28C, the sheet processing device 100 may have sheet guide passages extending in different directions in an S shape to guide the upper and lower sheets in opposite directions.

Next, a description is given of a laminating device, an image forming apparatus, and an image forming system, each including a sheet processing device according to an embodiment of the present disclosure.

FIG. 29 is a diagram illustrating an overall configuration of a laminating device including a sheet processing device according to an embodiment of the present disclosure. As illustrated in FIG. 29, a laminating device 200 includes the sheet processing device 100 described above, the branching claw 118 to switch the sheet conveyance passages of the lamination sheet S, heat pressing rollers 120 as heat pressing rotators to heat and press the lamination sheet S, and an ejection roller 121 disposed downstream from the heat pressing rollers 120 in the sheet conveyance direction.

The laminating device 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations can be performed automatically without human intervention, and convenience can be improved compared to the related art.

Figure 30:
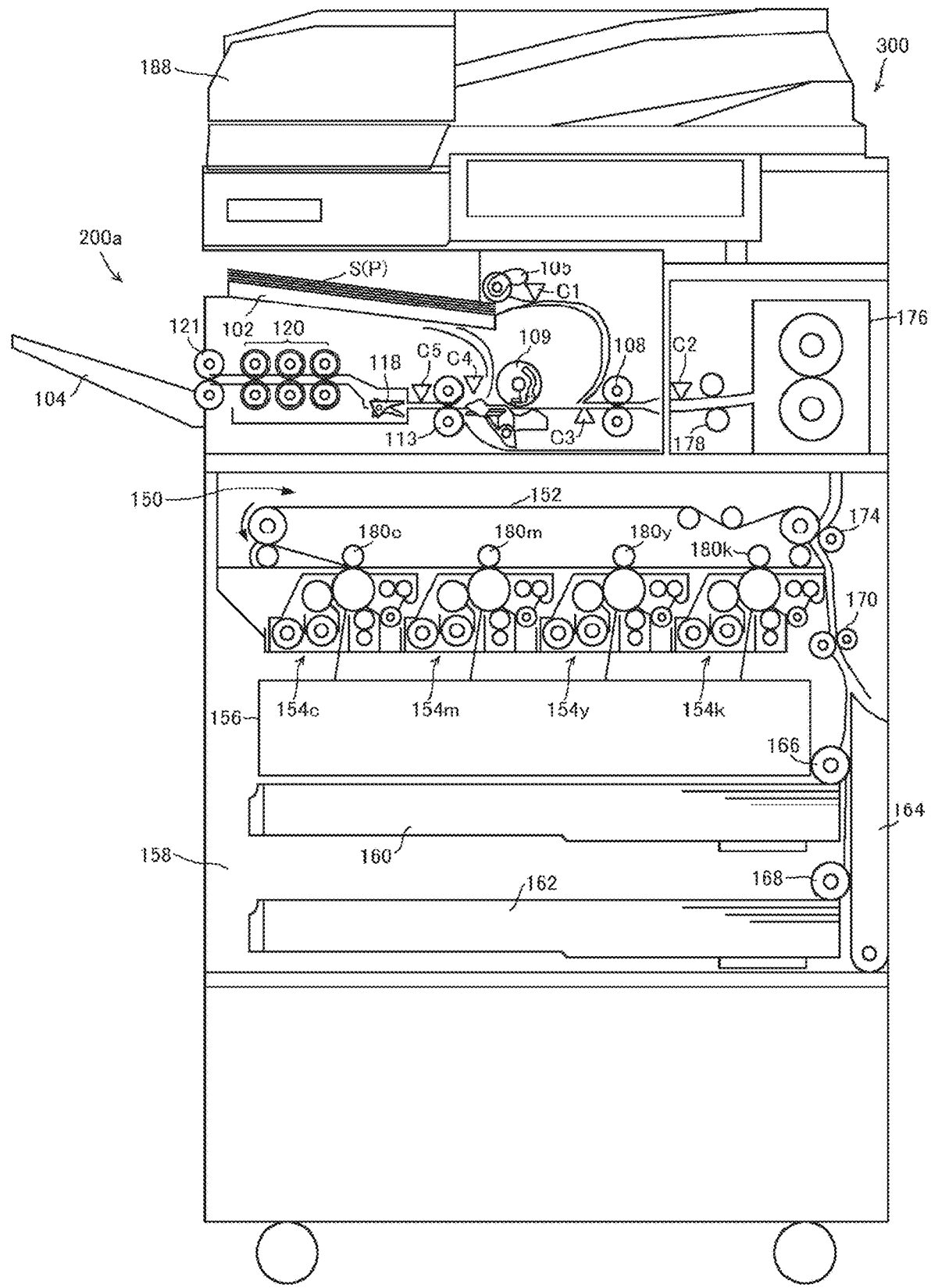
FIG. 30 is a diagram illustrating an overall configuration of an image forming apparatus including a laminating device according to an embodiment of the present disclosure.

FIG. 30 is a diagram illustrating an overall configuration of an image forming apparatus including a laminating device according to an embodiment of the present disclosure. An image forming apparatus 300 according to the present embodiment includes a laminating device 200a as a device that performs the sheet lamination inside the image forming apparatus 300.

The laminating device 200a includes the sheet tray 102 on which the lamination sheet S or the inner sheet P is loaded. The laminating device 200a is capable of receiving the lamination sheet S, the inner sheet P, or both from the image forming apparatus 300. Accordingly, the image forming apparatus 300 (e.g., a printer or a copier) is capable of adding (forming) an image on the lamination sheet S or the inner sheet P by the in-line connection.

The configuration of a main body of the image forming apparatus 300 is described in detail. As illustrated in FIG. 30, an intermediate transfer device 150 is disposed in the main body of the image forming apparatus 300. The intermediate transfer device 150 includes an endless intermediate transfer belt 152 wound around a plurality of rollers and stretched almost horizontally. The intermediate transfer belt 152 rotates counterclockwise in FIG. 30.

The image forming apparatus 300 further includes image forming devices 154c, 154m, 154y, and 154k for yellow (Y), magenta (M), cyan (C), and black (K), respectively, disposed below the intermediate transfer device 150. The image forming devices 154c, 154m, 154y, and 154k are arranged in a quadruple tandem manner along an extended direction of the intermediate transfer belt 152 in which the intermediate transfer belt 152 is stretched. Each of the image forming devices 154c, 154m, 154y and 154k includes a drum-shaped image bearer that rotates in the clockwise direction in FIG. 30. Various image forming components such as a charging device, a developing device, a transfer device, and a cleaning device are disposed around each of the image forming devices 154c, 154m, 154y, and 154k. Below each of the image forming devices 154e, 154m, 154y, and 154k, an exposure device 156 is disposed.

Below the exposure device 156, a sheet feeder 158 is disposed. The sheet feeder 158 includes a first sheet tray 160 that stores lamination sheets S and a second sheet tray 162 that stores the inner sheets P. Note that the first sheet tray 160 is an example of a third sheet loader on which a two-ply sheet such as the lamination sheet S is loaded. Similarly, the second sheet tray 162 is an example of a fourth sheet loader on which a sheet medium (e.g., the inner sheet P) is loaded.

A first feed roller 166 is disposed at a position upper right of the first sheet tray 160.

The first feed roller 166 feeds out the lamination sheet S one by one from the first sheet tray 160 to a sheet conveyance passage 164. A second feed roller 168 is disposed at a position upper right of the second sheet tray 162. The second feed roller 168 feeds out the inner sheet P one by one from the second sheet tray 162 to the sheet conveyance passage 164.

The sheet conveyance passage 164 extends upwardly on the right side in the main body of the image forming apparatus 300 and communicates with the laminating device 200a disposed in the main body of the image forming apparatus 300. The sheet conveyance passage 164 is provided with, e.g., a conveying roller 170, a secondary transfer device 174 disposed facing the intermediate transfer belt 152, a fixing device 176, and a sheet ejection device 178 including an ejection roller pair, serially.

Note that the first feed roller 166, the conveying roller 170. and the sheet conveyance passage 164 are examples of a third feeder to feed the two-ply sheet from the first sheet tray 160 (i.e., the third loader). The second feed roller 168, the conveying roller 170, and the sheet conveyance passage 164 are examples of a fourth feeder to feed the sheet medium from the second sheet tray 162 (i.e., the fourth loader). Further, the intermediate transfer device 150 and the fixing device 176 are examples of an image forming device that forms an image on the two-ply sheet or the sheet medium.

Next, a description is given of operations of the image forming apparatus 300 according to the present embodiment, to form an image on the lamination sheet S and then perform a lamination process on the lamination sheet S.

When forming an image on the lamination sheet S, firstly, an image reading device 188 reads the image on an original document. The exposure device 156 then performs image writing. Thereafter, the image forming devices 154c, 154m, 154y, and 154k form respective color toner images on the respective image bearers. Then, primary transfer devices 180c, 180m, 180y, and 180k sequentially transfer the respective toner images onto the intermediate transfer belt 152, thereby forming a color image on the intermediate transfer belt 152.

On the other hand, the image forming apparatus 300 rotates the first feed roller 166 to feed and convey the lamination sheet S to the sheet conveyance passage 164. Then, the lamination sheet S is conveyed by the conveying roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the image transfer, the fixing device 176 fixes the image on the lamination sheet S. The sheet ejection device 178 then sends the lamination sheet S to the laminating device 200a.

Further, the image forming apparatus 300 rotates the second feed roller 168 to feed the inner sheet P to the sheet conveyance passage 164. The sheet ejection device 178 ejects the inner sheet P to the laminating 200a.

As described above, the lamination sheet S on which the image has been formed and the inner sheet P are conveyed to the laminating device 200a, so that the lamination process is performed in the laminating device 200a. Since the details of the lamination process have been described above, the redundant descriptions are omitted.

According to the above-described configuration of the image forming apparatus 300 according to the present embodiment, the laminating device 200a may perform the lamination process after an image is formed on the inner sheet P. Alternatively, the laminating device 200a may perform the lamination process after the image forming operation has been performed on the inner sheet P and the lamination sheet S.

Next, a description is given of an image forming apparatus including a sheet processing device according to a modification and an image forming system including a sheet processing device according to an embodiment of the present disclosure.

Figure 31:
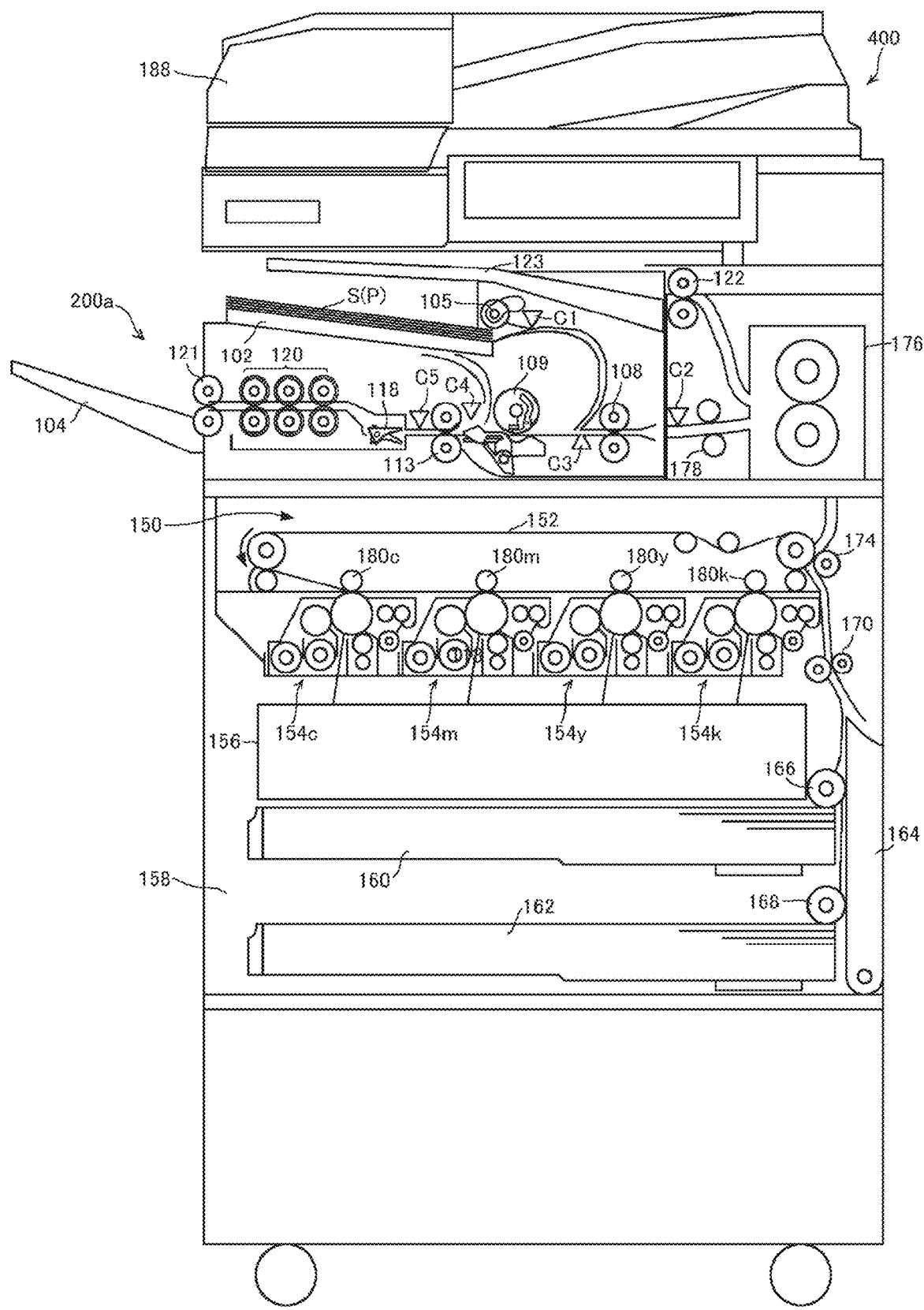
FIG. 31 is a diagram illustrating an overall configuration of the image forming apparatus including a laminating device according to a variation of the present disclosure.

FIG. 31 is a diagram illustrating an overall configuration of an image forming apparatus including a laminating device according to a modification of the embodiments of the present disclosure. An image forming apparatus 400 illustrated in FIG. 31 is basically the same as the image forming apparatus 300 illustrated in FIG. 30. However, different from the image forming apparatus 300 illustrated in FIG. 30, the image forming apparatus 400 includes an ejection roller pair 122 and an ejection tray 123, each of which is disposed in a main body of the image forming apparatus 400.

When the lamination process is not performed, the image forming apparatus 400 can eject the recording medium on which the image is formed using the ejection roller pair 122 to the ejection tray 123. Accordingly, the image forming apparatus 400 does not decrease the image output speed when the lamination process is not performed.

Note that the image forming apparatus 400 may include the laminating device 200a such that the laminating device 200a is detachably attached to the main body of the image forming apparatus 400. That is, when the lamination process is not required, the laminating device 200a may be detached from the image forming apparatus 400.

In this case, the sheet feed tray 103 on which the inner sheet P is loaded and the pickup roller 106 to feed the inner sheet P from the sheet feed tray 103 may be attached to the laminating device 200a thus removed, so that the laminating device 200a is used as a stand-alone machine similar to the laminating device 200 illustrated in FIG. 29.

The image forming apparatus 300 illustrated in FIG. 30 and the image forming apparatus 400 illustrated in FIG. 31 may include the sheet processing device 100 instead of a laminator. The image forming apparatus 400 illustrated in FIG. 31 may include a sheet processing device that is removably attached to the image forming apparatus 400.

An image forming system may include the image forming apparatus 300 or 400 and the sheet processing device 100 detachably attached to the image forming apparatus 300 or 400 or the laminating device 200 detachably attached to the image forming apparatus 300 or 400. An image forming system according to another embodiment of the present disclosure may further include, for example, at least one of a sheet feeder (a stacker) or a case binding device. Note that, in a case in which a lamination sheet S passes through the fixing device 176, the lamination sheet S is not bonded at a fixing temperature but is bonded by application of heat higher than the fixing temperature.

Although the image forming apparatuses 300 and 400 employ electrophotography for image formation on the lamination sheet S and the inner sheet P in the description above, the image formation method is not limited thereto. Alternatively, inkjet, stencil printing, or other printing method may be used.

Figure 32:
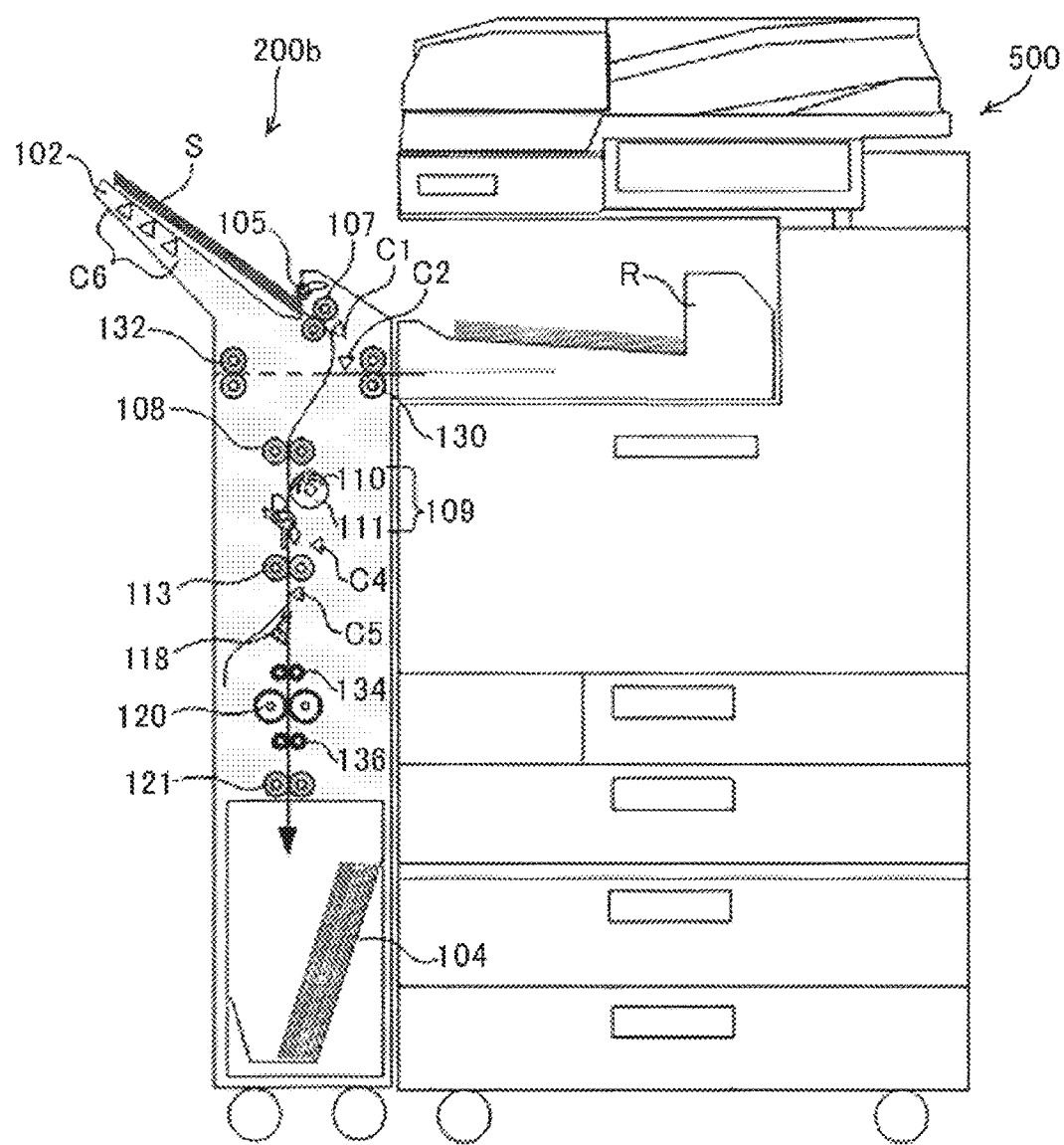
FIG. 32 is a diagram illustrating an overall configuration of an image forming apparatus including the laminating device in the outside of the image forming apparatus.
Figure 33:
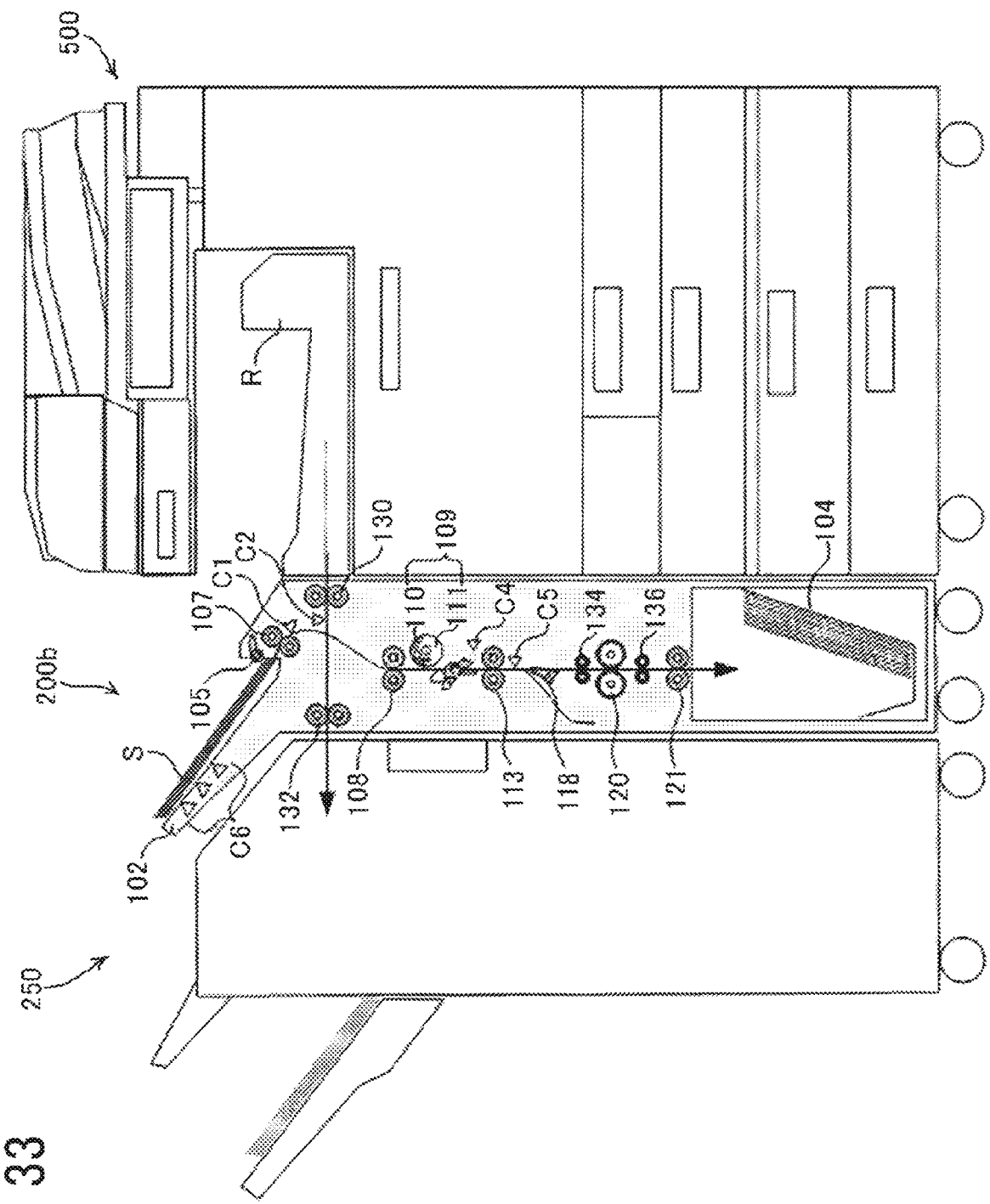
FIG. 33 is another diagram illustrating an overall configuration of the image forming apparatus including the laminating device in the outside of the image forming apparatus.

FIGS. 32 and 33 are diagrams each illustrating an overall configuration of an image forming apparatus including a laminating device according to an embodiment of the present disclosure. Note that, in FIGS. 32 to 33, elements identical to the elements illustrated in FIGS. 30 and 31 are given identical reference numerals, and the detailed descriptions of these elements are omitted.

An image forming apparatus 500 illustrated in FIG. 32 is basically the same as the image forming apparatus 300 illustrated in FIG. 30 or the image forming apparatus 400 illustrated in FIG. 31. However, different from the image forming apparatus 300 illustrated in FIG. 30 or the image forming apparatus 400 illustrated in FIG. 31, the image forming apparatus 500 includes a laminating device 200b, which is disposed outside a main body of the image forming apparatus 500.

The laminating device 200b includes the sheet tray 102 on which lamination sheets S are loaded. The inner sheets P are fed from the image forming apparatus 500 to the laminating device 200b via a relay device R. Accordingly, the image forming apparatus 500 (e.g., a printer or a copier) is capable of adding (forming) any image on the inner sheet P by the in-line connection.

The image forming apparatus 500 in FIG. 33 has a configuration in which a post-processing device 250 (i.e., at least one of a sheet feeder (a stacker) or a case binding device) is disposed downstream from the laminating device 200b in the sheet conveyance direction. According to a user's request, a job to perform the lamination process and the job not to perform the lamination process can be performed in parallel. Accordingly, the work efficiency can be enhanced.

Figures 34, 34A:
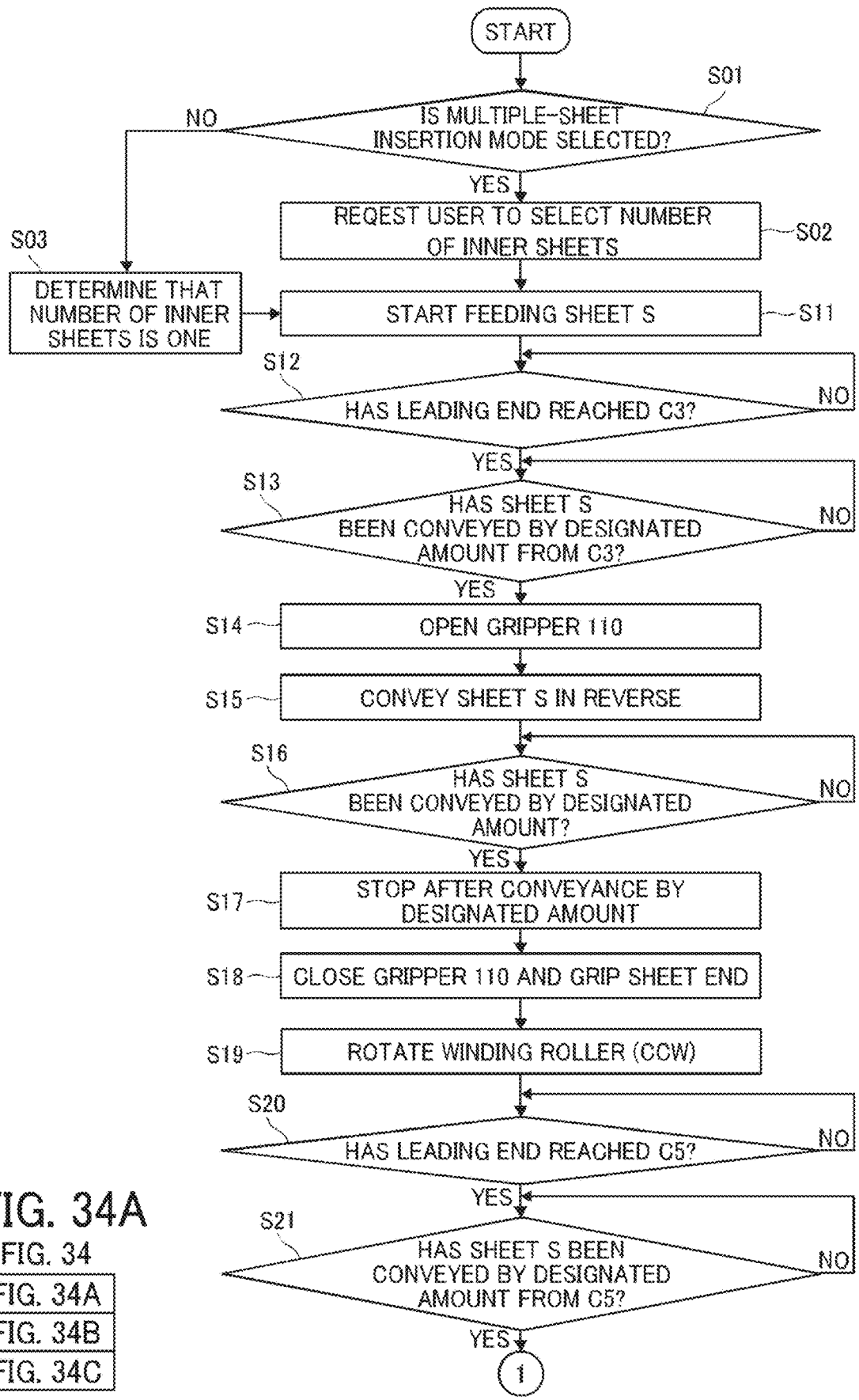
Figure 34C:
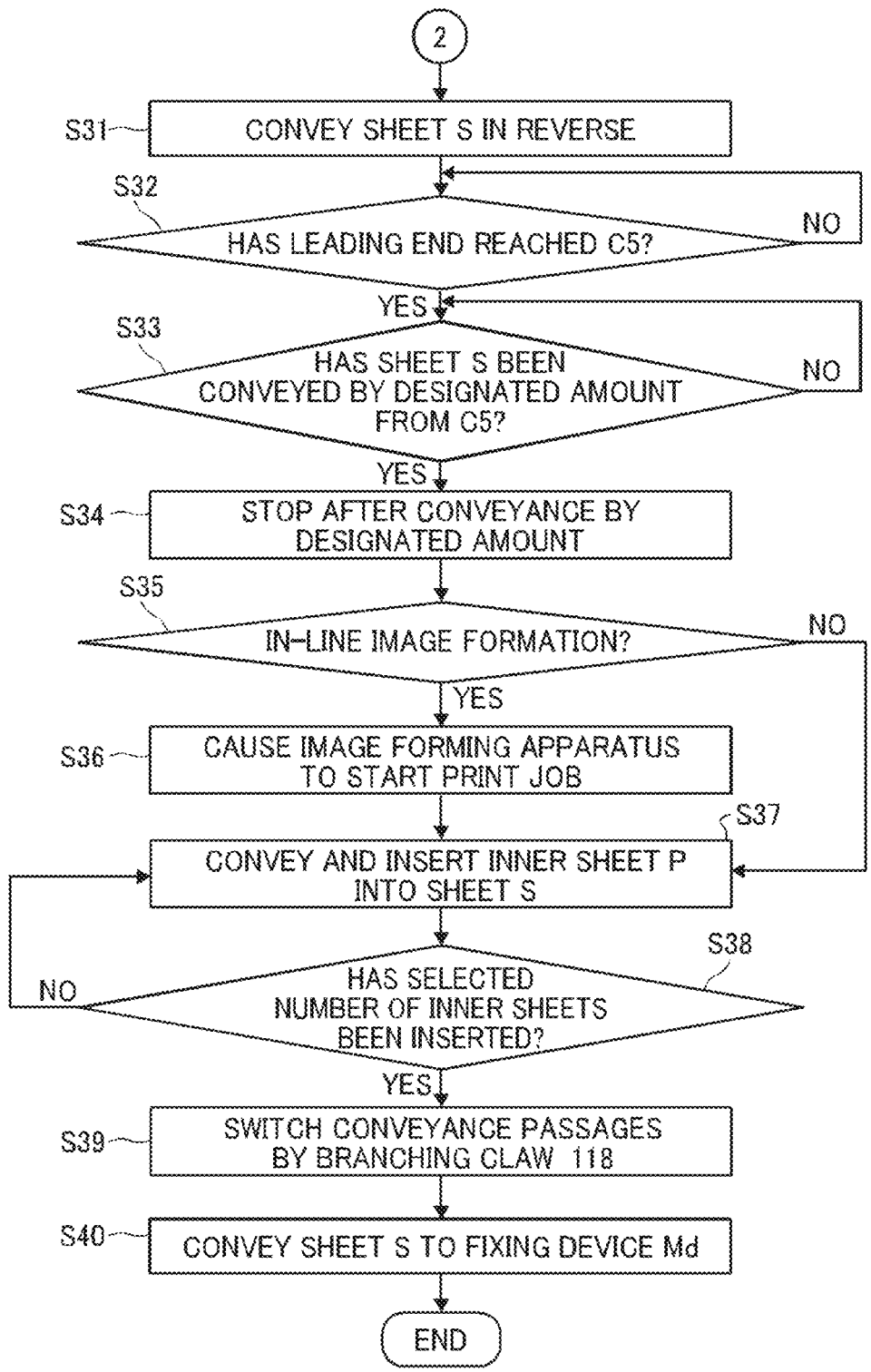

FIG. 34 is a flowchart illustrating a series of operations of feeding the lamination sheet S, inserting the inner sheet P, and laminating the lamination sheet S with the inner sheet P being inserted. A description is given below while indicating the reference numerals indicated in the flowchart in FIG. 34.

First, in step S01 of FIG. 34, the controller 600 of the sheet processing device 100 determines whether a user has selected the multiple insertion mode. When the user selects the multiple insertion mode (YES in step S01 of FIG. 34), the controller 600 of the sheet processing device 100 requests the user to select the number of inner sheets in step S02 of FIG. 34. The user may select the number of inner sheets using, for example, the operation panel 10.

On the other hand, when the controller 600 of the sheet processing device 100 determines that the user does not select the multiple insertion mode (NO in step S01 of FIG. 34), the controller 600 of the sheet processing device 100 performs step S03 of FIG. 34, that is, determines that the user has selected the single insertion mode.

In step S11 of FIG. 34 of FIG. 34, the controller 600 of the sheet processing device 100 causes the pickup roller 105 to start feeding the lamination sheet S (see FIG. 1). In step S12 of FIG. 34, the controller 600 of the sheet processing device 100 determines whether the leading end of the lamination sheet S has reached the conveyance sensor C3 based on the detection result of the conveyance sensor C3 (see FIG. 2). When the leading end of the lamination sheet S has not reached the conveyance sensor C3 (NO in step S12 of FIG. 34), step S12 is repeated until the leading end of the lamination sheet S reaches the conveyance sensor C3. By contrast, when the leading end of the lamination sheet S has reached the conveyance sensor C3 (YES in step S12 of FIG. 34), the process goes on to step S13. In step S13 of FIG. 34, the controller 600 of the sheet processing device 100 determines whether the lamination sheet S has been conveyed by a designated amount from the conveyance sensor C3, that is, whether a designated time has passed since the conveyance sensor C3 detects the leading end of the lamination sheet S. When the lamination sheet S has not been conveyed by the designated amount from the conveyance sensor C3 (NO in step S13 of FIG. 34), step S13 of FIG. 34 is repeated until the lamination sheet S is conveyed by the designated amount from the conveyance sensor C3. By contrast, when the lamination sheet S has been conveyed by the designated amount from the conveyance sensor C3 (YES in step S13 of FIG. 34), the controller 600 of the sheet processing device 100 causes the exit roller pair 113 to stop conveying the lamination sheet S temporarily (see FIG. 3). Subsequently, in step S14 of FIG. 34, the controller 600 of the sheet processing device 100 causes the gripper 110 to open. Then, in step S15 of FIG. 34, the controller 600 of the sheet processing device 100 causes the winding roller 109 to convey the lamination sheet S in the reverse conveyance direction (see FIG. 4).

In step S16 of FIG. 34, the controller 600 of the sheet processing device 100 determines whether the lamination sheet S has been conveyed by a designated amount. When the lamination sheet S has not been conveyed by the designated amount (NO in step S16 of FIG. 34), step S16 of FIG. 34 is repeated until the lamination sheet S is conveyed by the designated amount. By contrast, when the lamination sheet S has been conveyed by the designated amount (YES in step S16 of FIG. 34), in step S17 of FIG. 34, the controller 600 of the sheet processing device 100 causes the exit roller pair 113 to stop conveying the lamination sheet S temporarily. In step S18 of FIG. 34, the controller 600 of the sheet processing device 100 causes the gripper 110 to close and grip the trailing end of the lamination sheet S (see FIG. 5).

In step S19 of FIG. 34, the controller 600 of the sheet processing device 100 causes the winding roller 109 to rotate in the counterclockwise direction (i.e., in the reverse direction) and wind the lamination sheet S around the winding roller 109 (see FIG. 6). In step S20 of FIG. 34, the controller 600 of the sheet processing device 100 determines whether the leading end of the lamination sheet S has reached the conveyance sensor C5. When the leading end of the lamination sheet S has not reached the conveyance sensor C5 (NO in step S20 of FIG. 34), step S20 of FIG. 34 is repeated until the leading end of the lamination sheet S reaches the conveyance sensor C5. By contrast, when the leading end of sheet S has reached the conveyance sensor C5 (YES in step S20 of FIG. 34), the process goes on to step S21 of FIG. 34. In step S21 of FIG. 34, the controller 600 of the sheet processing device 100 determines whether the lamination sheet S has been conveyed by a designated amount from the conveyance sensor C5. When the lamination sheet S has not been conveyed by the designated amount from the conveyance sensor C5 (NO in step S21 of FIG. 34), step S21 of FIG. 34 is repeated until the lamination sheet S is conveyed by the designated amount from the conveyance sensor C5. By contrast, when the lamination sheet S has been conveyed by the designated amount from the conveyance sensor C5 (YES in step S21 of FIG. 34), in step S22 of FIG. 34, the controller 600 causes the abnormality detection sensor C4 to detect the condition of the lamination sheet S. Then, in step S23 of FIG. 34, the controller 600 determines whether the condition of the lamination sheet S is normal based on the detection results of the abnormality detection sensor C4.

The abnormality detection sensor C4 is an abnormality detector to detect the size of the space between the two sheets of the lamination sheet S for the sheet processing device 100 to determine whether the size of the space exceeds the predetermined threshold value. In step S23 of FIG. 34, the controller 600 of the sheet processing device 100 determines whether the condition of the lamination sheet S is normal, that is, whether the size of the space between the two sheets of the lamination sheet S is equal to or greater than the predetermined threshold value, based on the detection result of the abnormality detection sensor C4. When the condition of the lamination sheet S is normal (YES in step S23 of FIG. 34), the process goes on to step S24a of FIG. 34.

By contrast, the controller 600 of the sheet processing device 100 determines that the condition of the lamination sheet S is abnormal, in other words, when the controller 600 of the sheet processing device 100 determines that the size of the space is smaller than the predetermined threshold value (NO in step S23 of FIG. 34), in step S24b of FIG. 34, the controller 600 of the sheet processing device 100 provides information indicating the abnormality. For example, the controller 600 of the sheet processing device 100 causes the operation panel 10 to display the abnormality (e.g., displays an error message) and stops the series of operations of sheet processing job.

In step S24a of FIG. 34, the controller 600 of the sheet processing device 100 causes the winding roller 109 to convey the lamination sheet S in the direction opposite to the winding direction (i.e., in the direction A in FIG. 12B) and convey the sticking area r of the lamination sheet S downstream from the exit roller pair 113 in the forward conveyance direction. As a result, the sagging space g is formed at the position that matches the insertion position of the separation claw 116.

When the process proceeds to step S24c of FIG. 34, the controller 600 of the sheet processing device 100 causes the separation claws 116 to insert into the sagging space g from the opposed sides of the lamination sheet S (see FIG. 7). In step S25 of FIG. 34, the controller 600 of the sheet processing device 100 causes the winding roller 109 to rotate in the clockwise direction (i.e., in the forward direction) with the separation claws 116 inserted into the sagging space g from the opposed sides of the lamination sheet S and convey the lamination sheet S in the forward conveyance direction.

Then, in step S26 of FIG. 34, the controller 600 of the sheet processing device 100 determines whether the leading end of the lamination sheet S has reached the conveyance sensor C5. When the leading end of the lamination sheet S has not reached the conveyance sensor C5 (NO in step S26 of FIG. 34), step S26 of FIG. 34 is repeated until the leading end of the lamination sheet S reaches the conveyance sensor C5. By contrast, when the leading end of sheet S has reached the conveyance sensor C5 (YES in step S26 of FIG. 34), the process goes on to step S27 of FIG. 34. In step S27 of FIG. 34, the controller 600 of the sheet processing device 100 determines whether the lamination sheet S has been conveyed by a designated amount from the conveyance sensor C5. When the lamination sheet S has not been conveyed by the designated amount from the conveyance sensor C5 (NO in step S27 of FIG. 34), step S27 is repeated until the lamination sheet S is conveyed by the designated amount from the conveyance sensor C5. By contrast, when the lamination sheet S has been conveyed by the designated amount from the conveyance sensor C5 (Yes in S27 of FIG. 34), in step S28 of FIG. 34, the controller 600 of the sheet processing device 100 causes the gripper 110 to open.

Then, in step S29 of FIG. 34, the controller 600 of the sheet processing device 100 causes the exit roller pair 113 to stop conveying the lamination sheet S temporarily after the lamination sheet S has been conveyed by the designated amount. Then, in step S30 of FIG. 34, the controller 600 causes the separation claws 116 to move further in a sheet width direction, which is the width direction of the lamination sheet S (see FIG. 8). As a result, the lamination sheet S is separated into the upper and lower sheets at the trailing end in the forward conveyance direction.

In step S31 of FIG. 34, the controller 600 of the sheet processing device 100 causes the exit roller pair 113 to convey the lamination sheet S in the reverse conveyance direction. Then, in step S32 of FIG. 34, the controller 600 determines whether the leading end of the lamination sheet S in the forward conveyance direction has reached the conveyance sensor C5. When the leading end of the lamination sheet S has not reached the conveyance sensor C5 (NO in step S32 of FIG. 34), step S32 of FIG. 34 is repeated until the leading end of the lamination sheet S reaches the conveyance sensor C5. By contrast, when the leading end of sheet S has reached the conveyance sensor C5 (YES in step S32 of FIG. 34), the process goes on to step S33 of FIG. 34. In step S33 of FIG. 34, the controller 600 of the sheet processing device 100 determines whether the lamination sheet S has been conveyed by a designated amount from the sheet sensor C5. When the lamination sheet S has not been conveyed by the designated amount from the sheet sensor C5 (NO in step S33 of FIG. 34), step S33 of FIG. 34 is repeated until the lamination sheet S is conveyed by the designated amount from the sheet sensor C5. By contrast, when the lamination sheet S has been conveyed by the designated amount from the sheet sensor C5 (YES in step S33 of FIG. 34), in step S34 of FIG. 34, the controller 600 causes the exit roller pair 113 to stop conveying the lamination sheet S temporarily (see FIG. 9). is a result, the separation of the lamination sheet S is completed.

Subsequently, in step S35 of FIG. 34, the controller 600 of the sheet processing device 100 determines whether to perform the image forming operation (with an inline image forming apparatus) on the inner sheet P to be inserted into the lamination sheet S. When the image forming operation is performed with an inline image forming apparatus (YES in step S35 of FIG. 34), in step S36 of FIG. 34, the controller 600 of the sheet processing device 100 sends a signal to cause the inline image forming apparatus to start the print job (i.e., the printing operation) to form an image on the inner sheet P. Then, the process goes on to step S37 of FIG. 34.

By contrast, when the image forming operation is not performed with an inline image forming apparatus (NO in step S35 of FIG. 34), the process goes on to step S37 of FIG. 34.

In step S37 of FIG. 34, the controller 600 of the sheet processing device 100 causes the entrance roller pair 108 to convey the inner sheet P in the forward conveyance direction and insert into the opening of the lamination sheet S (see FIG. 25). In step S37 of FIG. 34, when the controller 600 of the sheet processing device 100 performs the single insertion mode, the controller 600 of the sheet processing device 100 performs operations described above with reference to FIGS. 15 to 17. When the controller 600 of the sheet processing device 100 performs the multiple insertion mode, the controller 600 of the sheet processing device 100 performs operations described above with reference to in FIGS. 18 to 21.

In step S38 of FIG. 34, the controller 600 of the sheet processing device 100 determines whether the selected number of inner sheets P has been inserted into the lamination sheet S. When the selected number of inner sheets P has not been inserted into the lamination sheet S (NO in step S38 of FIG. 34), step S37 is repeated until the selected number of inner sheets P has been inserted into the lamination sheet S. By contrast, when the selected number of inner sheets P has been inserted (YES in step S38 of FIG. 34), the process goes on to step S39 of FIG. 34.

Then, in step S39 of FIG. 34, the controller 600 of the sheet processing device 100 causes the branching claw 118 to switch (change) the sheet conveyance passages of the lamination sheet S. In step S39 of FIG. 34, the controller 600 of the sheet processing device 100 conveys the lamination sheet S sandwiching the inner sheet P to the heat pressing device (e.g., the fixing device 176), and heat and pressure are applied to complete the lamination process (see FIG. 22).

In the case of in-line image formation (Yes in step S35 of FIG. 34), the controller 600 of the sheet processing device 100 sends the image forming apparatus the signal to start the print job after the sheet processing device 100 completes separating the lamination sheet S. The image forming apparatus prints an image on the inner sheet P and conveys the inner sheet P to the sheet processing device 100. In this case, the sheet processing device 100 waits until the printed inner sheet P is conveyed and reaches the conveyance sensor C1. The controller 600 of the sheet processing device 100 may send the image forming apparatus the signal to start the print job in advance based on a time to convey the printed inner sheet P, for example, after the separation claws 116 completes the operation illustrated in FIG. 7. Such a configuration enhances the productivity.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications to the above-described embodiment and variations are possible. It is therefore to be understood that, within the scope of the appended claims, the disclosure of this patent specification may be practiced otherwise than as specifically described herein. For example, embodiments and variations may be combined with each other. Such variations are not to be regarded as a departure from the scope of the present disclosure and appended claims, and all such modifications are intended to be included within the scope of the present disclosure and appended claims.

The invention claimed is:

1. A sheet processing device comprising:
a conveyor configured to convey a two-ply sheet in which two sheets are overlapped and bonded together at a portion of the two-ply sheet;
a rotator configured to wind the two-ply sheet;
a separator; and
control circuitry configured to:
cause the conveyor to convey the two-ply sheet in a winding direction to wind the two-ply sheet around the rotator such that a sagging space is created in the two-ply sheet; and
cause the separator to insert into the sagging space to separate the two-ply sheet into two sheets,
the control circuitry being configured to cause the conveyor to convey the two-ply sheet in a direction opposite the winding direction to move the sagging space to a specified position before an insertion of the separator into the sagging space.

2. The sheet processing device according to claim 1, wherein the control circuitry is configured to set a distance by which the conveyor conveys the two-ply sheet in the direction opposite the winding direction, in advance before a sheet processing operation.

3. The sheet processing device according to claim 1, wherein a distance by which the conveyor conveys the two-ply sheet in the direction opposite the winding direction is not larger than a distance between centers of the rotator and the conveyor.

4. The sheet processing device according to claim 1, further comprising an operation panel configured to change a distance by which the conveyor conveys the two-ply sheet in the direction opposite the winding direction.

5. The sheet processing device according to claim 1, further comprising a detector configured to detect a vertex position of the sagging space created in the two-ply sheet, wherein the control circuitry is configured to cause the conveyor to convey the two-ply sheet in the direction opposite the winding direction in a case in which the vertex position of the sagging space is not a position at which the separator is insertable into the two-ply sheet.

6. The sheet processing device according to claim 5, wherein the control circuitry is configured to convey the two-ply sheet in the direction opposite the winding direction until the detector detects the vertex position of the sagging space at the position at which the separator is insertable into the two-ply sheet.

7. The sheet processing device according to claim 1, wherein the control circuitry is configured to convey the two-ply sheet in the direction opposite the winding direction, stop conveying the two-ply sheet, and insert the separator into the sagging space of the two-ply sheet stopped.

8. A laminating device comprising:
the sheet processing device according to claim 1; and
a heat pressing device configured to heat and press the two-ply sheet.

9. An image forming system comprising:
an image forming apparatus; and
the laminating device according to claim 8.

10. An image forming system comprising:
an image forming apparatus; and
the sheet processing device according to claim 1.

11. The sheet processing device according to claim 1, wherein the specified position is a position at which the separator is insertable into the two-ply sheet.

12. A sheet processing device comprising:
a conveyor configured to convey a two-ply sheet in which two sheets are overlapped and bonded together at a portion of the two-ply sheet;
a rotator configured to wind the two-ply sheet;
a separator; and
control circuitry configured to:

cause the conveyor to convey the two-ply sheet in a winding direction to wind the two-ply sheet around the rotator such that a sagging space is created in the two-ply sheet; and cause the separator to insert into the sagging space to separate the two-ply sheet into two sheets, the control circuitry being configured to cause the conveyor to convey the two-ply sheet in a direction opposite the winding direction before an insertion of the separator into the sagging space, wherein the control circuitry is configured to change a distance by which the conveyor conveys the two-ply sheet in the direction opposite the winding direction, according to sheet data of the two-ply sheet.

13. The sheet processing device according to claim 12, wherein the sheet data is at least one of a size of the two-ply sheet, a thickness of the two-ply sheet, or a material of the two-ply sheet.

14. A laminating device comprising:
the sheet processing device according to claim 12; and
a heat pressing device configured to heat and press the two-ply sheet.

15. An image forming system comprising:
an image forming apparatus; and
the laminating device according to claim 14.

16. An image forming system comprising:
an image forming apparatus; and
the sheet processing device according to claim 12.

17. A sheet processing device comprising:
a conveyor configured to convey a two-ply sheet in which two sheets are overlapped and bonded together at a portion of the two-ply sheet;
a rotator configured to wind the two-ply sheet;
a separator;
a detector configured to detect a height of the sagging space created in the two-ply sheet; and;
control circuitry configured to:
cause the conveyor to convey the two-ply sheet in a winding direction to wind the two-ply sheet around the rotator such that a sagging space is created in the two-ply sheet; and cause the separator to insert into the sagging space to separate the two-ply sheet into two sheets, the control circuitry being configured to cause the conveyor to convey the two-ply sheet in a direction opposite the winding direction before an insertion of the separator into the sagging space, and the control circuitry being configured to cause the conveyor to convey the two-ply sheet in the direction opposite the winding direction in a case in which the height of the sagging space created in the two-ply sheet is not larger than a threshold value.

18. A laminating device comprising:
the sheet processing device according to claim 17; and
a heat pressing device configured to heat and press the two-ply sheet.

19. An image forming system comprising:
an image forming apparatus; and
the laminating device according to claim 18.

20. An image forming system comprising:
an image forming apparatus; and
the sheet processing device according to claim 17.

* * * * *